United States Patent
Sumita et al.

(10) Patent No.: US 10,991,468 B2
(45) Date of Patent: Apr. 27, 2021

(54) LOAD-FOLLOWING NUCLEAR REACTOR SYSTEM USING THERMAL EXPANSION-BASED NEUTRON REFLECTOR MOVEMENT AND FUEL ASSEMBLY INTERVAL ADJUSTMENT MECHANISMS AND LIQUID METAL PRIMARY COOLANT

(71) Applicant: Clear Inc., Tokyo (JP)

(72) Inventors: Osao Sumita, Tokyo (JP); Isao Ueno, Tokyo (JP); Takehiko Yokomine, Onojo (JP)

(73) Assignee: Clear Inc., Tokyo (JP)

( * ) Notice: Subject to any disclaimer, the term of this patent is extended or adjusted under 35 U.S.C. 154(b) by 377 days.

(21) Appl. No.: 16/096,228

(22) PCT Filed: Apr. 25, 2017

(86) PCT No.: PCT/JP2017/016426
§ 371 (c)(1),
(2) Date: Apr. 4, 2019

(87) PCT Pub. No.: WO2017/188274
PCT Pub. Date: Nov. 2, 2017

(65) Prior Publication Data
US 2019/0311816 A1     Oct. 10, 2019

(30) Foreign Application Priority Data
Apr. 26, 2016   (JP) .............................. JP2016-087915

(51) Int. Cl.
*G21C 7/28* (2006.01)
*G21C 1/02* (2006.01)
(Continued)

(52) U.S. Cl.
CPC ............... *G21C 7/28* (2013.01); *G21C 1/02* (2013.01); *G21C 3/02* (2013.01); *G21C 7/02* (2013.01);
(Continued)

(58) Field of Classification Search
CPC ........ G21C 15/18; G21C 9/012; G21C 13/02; G21C 1/02; G21C 7/10; G21C 7/02;
(Continued)

(56) References Cited

U.S. PATENT DOCUMENTS

| | | |
|---|---|---|
| 2,495,745 A | 1/1950 | Litton |
| 3,049,483 A | 8/1962 | Kesselring |

(Continued)

FOREIGN PATENT DOCUMENTS

| | | |
|---|---|---|
| JP | H01101497 A | 4/1989 |
| JP | H0815473 A | 1/1996 |

(Continued)

OTHER PUBLICATIONS

Japanese Patent Application No. 2018-514637, Office Action dated Nov. 10, 2020, with English Translation, 5 pages.
(Continued)

*Primary Examiner* — Darlene M Ritchie
(74) *Attorney, Agent, or Firm* — Patterson + Sheridan, LLP

(57) ABSTRACT

Provided is a nuclear reactor having a load following control system in which a nuclear reaction therein is naturally controlled by the generated heat, the nuclear reactor being provided with: a reactor core provided with a plurality of fuel assemblies of metallic fuels containing uranium (U) 235, 238 and/or plutonium (Pu) 239; a primary coolant comprising a liquid metal; a neutron reflector which serves to control the nuclear reaction in the reactor core and is disposed to enclose the periphery of the reactor core; and a
(Continued)

mechanism which contains a-liquid or a gas having a thermal expansion coefficient greater than that of the neutron reflector, and converts the coefficient of volumetric expansion into an amount of linear thermal expansion, and, by using same, moves the neutron reflector or adjusts the spacing between the plurality of fuel assemblies.

20 Claims, 15 Drawing Sheets

(51) Int. Cl.

| | | |
|---|---|---|
| *G21C 3/02* | (2006.01) | |
| *G21C 7/02* | (2006.01) | |
| *G21C 7/30* | (2006.01) | |
| *G21C 11/06* | (2006.01) | |
| *G21C 7/10* | (2006.01) | |
| *G21D 3/16* | (2006.01) | |
| *G21D 3/12* | (2006.01) | |

(52) U.S. Cl.
CPC ............... *G21C 7/10* (2013.01); *G21C 7/30* (2013.01); *G21C 11/06* (2013.01); *G21D 3/12* (2013.01); *G21D 3/16* (2013.01); *Y02E 30/30* (2013.01)

(58) Field of Classification Search
CPC . G21C 7/28; G21C 7/30; G21C 11/06; G21C 3/02; G21C 3/60; Y02E 30/30; G21D 3/04; G21D 3/16; G21D 3/12
See application file for complete search history.

(56) References Cited

U.S. PATENT DOCUMENTS

| | | | |
|---|---|---|---|
| 3,287,225 A | | 11/1966 | Ackroyd et al. |
| 3,321,371 A | * | 5/1967 | Kambara ................. G21C 7/06 376/213 |
| 5,196,159 A | * | 3/1993 | Kawashima ............. G21C 7/28 376/221 |
| 10,014,081 B2 | * | 7/2018 | Laughman ............... G21C 7/26 |
| 10,867,710 B2 | * | 12/2020 | Cisneros, Jr. .......... G21C 11/06 |
| 2010/0239060 A1 | * | 9/2010 | Horie ....................... G21C 7/28 376/220 |
| 2011/0206173 A1 | | 8/2011 | Walters |
| 2015/0049850 A1 | * | 2/2015 | Hattori .................... G21C 1/02 376/211 |
| 2017/0213610 A1 | | 7/2017 | Sumita et al. |

FOREIGN PATENT DOCUMENTS

| | | |
|---|---|---|
| JP | 2013-520657 A | 6/2013 |
| JP | 2015165554 A | 9/2015 |
| WO | 2013094196 A1 | 6/2013 |

OTHER PUBLICATIONS

A. A. Bostrom, The High Temperature Oxidation of Zircaloy in Water, WAPD-104, Mar. 19, 1954.
W. F. Murphy, W. N. Beck, F. L. Brown, B. J. Koprowski, and L. A. Neimark, Postirradiation Examination of U—Pu—Zr Fuel Elements Irradiated in EBR-I1 to 4.5 Atomic Percent Burnup, ANL-7602, Nov. 1969.
Thermoelectric Conversion Technology, Survey Report on Technology Trends of Patent Applications, Japan Patent Office, dated Mar. 2014.
Laurence W. Gertsma and David W. Medwid, Design and Fabrication of a Counterflow Double-Containment Tantalum-Stainless Steel Mercury Boiler, Lewis Research Center, Cleveland, Ohio, National Aeronautics and Space Administration, Washington, D. C., May 1969.
International Search Report, PCT/JP2017/016426, dated Aug. 1, 2017, 2 pages.
European Patent Application No. 17789556.2, Supplementary European Search Report dated Oct. 25, 2019, 10 pages.

* cited by examiner

LOAD-FOLLOWING NUCLEAR REACTOR SYSTEM USING THERMAL EXPANSION-BASED NEUTRON REFLECTOR MOVEMENT AND FUEL ASSEMBLY INTERVAL ADJUSTMENT MECHANISMS AND LIQUID METAL PRIMARY COOLANT

CROSS-REFERENCE TO RELATED APPLICATIONS

This application is a 371 U.S. National Stage of International Application No. PCT/JP2017/016426, filed Apr. 25, 2017, which claims priority to Japanese Patent Application No. 2016-087915, filed Apr. 26, 2016, the disclosures of which are all herein incorporated by reference in their entirety.

TECHNICAL FIELD

The present invention relates to a nuclear reactor system and structure for a small nuclear power generation system, and to a nuclear reactor structure incorporating a physical safety system instead of a conventional engineering safety system. In other words, the present invention relates to a small nuclear reactor incorporating a load-following control system, which controls a nuclear reaction in a nuclear reactor naturally.

BACKGROUND ART

A light-water reactor power generation system which employs light water as a coolant is a mainstream of conventional major nuclear power generation systems. Nuclear fuel rods each prepared by inserting a metal oxide fuel into a Zircaloy cladding tube are loaded in a nuclear reactor for use in this system. A nuclear reaction is controlled by control rods containing boron carbide and the like. Then, steam generated by nuclear heating is sent to a turbine for power generation. Further, such light-water reactor power generation systems are classified broadly into a boiling-water type representing a direct system and a pressurized-water type representing an indirect system. A pressurized-water type reactor representing a nuclear reactor system of an indirect cycle type includes a steam generator and a heat exchanger which are located between a primary cooling system and a secondary cooling system.

A nuclear reactor used in a large power generation system of this type is equipped with a reactor core, which includes an assembly of numerous fuel rods each formed from a cladding tube that houses a fuel prepared by pelletizing a metal oxide containing uranium (U)-235 or plutonium (Pu)-239 with a low heat transfer property. The reactor core used in the large nuclear reactor assembles some 200 bunches of fuel rod bundles each prepared by bundling several tens of fuel rods, and arranges control rods in spaces of the assembled fuel rods in order to control a reaction rate of the fuel.

CITATION LIST

Patent Literature 1

PATENT LITERATURE 1: Japanese Patent Application No. 2015-75942
PATENT LITERATURE 2: JP-A-2015-165554
NON PATENT LITERATURE 3: U.S. Pat. No. 2,495,745

Non Patent Literature 1

NON PATENT LITERATURE 1: A. A. Bostrom, THE HIGH TEMPERATURE OXIDATION OF ZIRCALOY IN WATER, WAPD-104, Mar. 19, 1954
NON PATENT LITERATURE 2: W. F. Murphy, W. N. Beck, F. L. Brown, B. J. Koprowski, and L. A. Neimark, POSTIRRADIATION EXAMINATION OF U—Pu—Zr FUEL ELEMENTS IRRADIATED IN EBR-I1 TO 4.5 ATOMIC PERCENT BURNUP, ANL-7602, November, 1969
NON PATENT LITERATURE 3: THERMOELECTRIC CONVERSION TECHNOLOGY, SURVEY REPORT ON TECHNOLOGY TRENDS OF PATENT APPLICATIONS, Japan Patent Office, March 2014
NON PATENT LITERATURE 4: DESIGN AND FABRICATION OF A COUNTERFLOW DOUBLE-CONTAINMENT TANTALUM-STAINLESS STEEL MERCURY BOILER by Laurence W. Gertsma and David W. Medwid, Lewis Research Center, Cleveland, Ohio, NATIONAL AERONAUTICS AND SPACE ADMINISTRATION, WASHINGTON, D.C., MAY 1969

SUMMARY OF INVENTION

Technical Problem

In the large nuclear reactor using the control rods as described above, the nuclear reaction in the reactor core has a risk of running out of control if the control rods fail to function due to a breakdown of a mechanism for controlling positions of the control rods, and so forth. A more serious problem other than the above is that a Zircaloy-2 or -4 alloy significantly increases a risk of generating hydrogen gas by reaction with water in accordance with the following chemical formula at a high temperature equal to or above 1000° C. (NON PATENT LITERATURE 1):

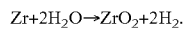

$$Zr+2H_2O \rightarrow ZrO_2+2H_2. \qquad \text{(Formula 1)}$$

In the case of a large light-water reactor, the nuclear reaction rapidly progresses and the temperature reaches 1000° C. and above if the control rods therein are not driven. In this case, the reactor is designed to activate a safety system such as a rapid core cooling system so as to avoid a rise in temperature of the fuel rods. However, if this safety system fails to function, there is a high risk of rapid generation of hydrogen gas in the reactor core, which may react with oxygen in the air and cause an explosion. To avoid the risk of a hydrogen explosion and the like, such light-water reactor incorporates various engineering safety systems such as a control rod activation system and a core cooling system. However, these engineering safety systems are costly. The nuclear reactor has to be increased in size in order to reduce unit electric power costs. Accordingly, light-water reactors in recent years have been designed and built on the premise of being increased in size.

Meanwhile, there is a fast reactor using metallic sodium (Na) or the like as a primary coolant though this reactor is still in a development stage. The Japanese fast reactor "Monju" employs metallic Na as a primary coolant and water as a secondary coolant. Moreover, a metal oxide fuel is loaded therein and its nuclear reaction is controlled by using control rods containing boron carbide as a neutron absorber. The metallic Na that is the primary coolant has a risk of reacting with the water that is the secondary coolant and thus generating hydrogen gas which is explosive. Accordingly, an intermediate heat exchanger is installed in a circulation system for the metallic Na being the primary coolant, thereby doubling the metallic Na circulation lines. The water being the secondary coolant is transformed into steam with a heater and a steam generator by using the heat of the metallic Na that is heated by the intermediate heat exchanger, and the steam rotates a steam turbine to generate electric power. Thus, the nuclear power generation system is also complicated in the case of the fast reactor due to the safety reason.

As described above, the engineering safety systems are indispensable for current commercial nuclear reactors. For this reason, increases in manufacturing and construction costs are unavoidable. The safety systems are basically indispensable for nuclear reactors that employ nuclear fission reactions. However, as mentioned above, the engineering safety systems always face inadequacies in terms of the safety, and an attempt to construct a perfect safety system causes a problem of a significant increase in installation cost of such safety system. An object of the present invention is to construct a nuclear reactor system which adopts a physical safety system instead of the above-described engineering safety systems.

Solution to Problem

A physical safety system means control of nuclear fuel burnup based on a natural phenomenon in a reactor core of a nuclear reactor. Examples of the natural phenomenon in the nuclear reactor include heat, a quantity of neutrons, and the like. Among them, the heat is an extremely important factor. While materials constituting a nuclear reactor include structural material, fuel, and the like, all these materials are inevitably subjected to thermal expansion or thermal contraction by the heat. A nuclear reaction can be controlled by using a phenomenon that a structural material is deformed by the heat. A specific explanation of this phenomenon will be discussed below.

(1) Control of Nuclear Reactivity by Change in Nuclear Fuel Density (1-1) Thermal Expansion of Fuel According to NON PATENT LITERATURE 2, when a uranium (U)-plutonium (Pu)-zirconium (Zr) ternary alloy fuel is heated to a range from 600° to 650° C., its thermal expansion coefficient is increased approximately by three orders of magnitude. As each fuel rod expands, the density of U or Pu therein is reduced and its nuclear reactivity drops as a consequence.

(1-2) Layout of Fuel Assemblies

When a layout of fuel rod assemblies constituting the reactor core of the nuclear reactor is changed by thermal expansion of each fuel rod assembly support and when an internal distance of the fuel rod assemblies is increased, such an increase reduces the virtual density of U or Pu therein and the nuclear reactivity drops as a consequence.

(2) Control of Neutron Leakage Probability/Quantity

A neutron flux generated by a nuclear fissile substance such as Pu and U contained in the fuel rods/fuel assemblies are broadly classified into two types of neutrons, namely, neutrons that leak out of the system such as out of the nuclear reactor and neutrons that are reabsorbed by the fuel rods and contribute to the nuclear fission. A proportion of the neutrons leaking out of the system depends on the following parameters.

(2-1) Efficiency of Reflector

A density of the neutron flux in the reactor core depends largely on reflection efficiency of a reflector surrounding the reactor core. It is possible to achieve a neutron multiplication factor $K_{eff}$ equal to above 1 by using an efficient reflector. A load-following control mode is enabled by changing the reflection efficiency depending on a heat output from the reactor core.

(2-2) Characteristics of Coolants

Examples of the coolants to be used in the present invention include metallic Na, lead (Pb)-bismuth (Bi), Pb, and Sn single body. Now, characteristics of the respective substances will be described.

(Density of Metallic Sodium as Coolant)

The density of metallic Na depends on the temperature, or on the thermal expansion rate to be more precise. Since the density is reduced with a rise in temperature, the neutron leakage probability becomes larger and the neutron multiplication factor $K_{eff}$ is reduced close to 1 as a consequence. If the temperature is increased more, the factor $K_{eff}$ becomes equal to or below 1 which makes it impossible to maintain criticality in the nuclear reactor. On the other hand, when the temperature drops, the neutron leakage probability is reduced and the factor $K_{eff}$ becomes equal to or above 1. Hence, it is possible to maintain a nuclear fission chain reaction.

Here, the boiling point of metallic Na is 880° C. and formation of voids does not usually become a problem. Nonetheless, metallic Na in contact with the fuel rods reaches a high temperature whereby small voids may be formed at a temperature below its boiling point. As a consequence, there remains a problem that the void coefficient of the reactivity turns out to be "positive". However, metallic Na has an advantage that the problem of the void coefficient diminishes as the leakage amount of the neutrons grows larger due to the high temperature.

(Other Coolants)

Besides metallic Na, Pb also serves as the coolant for the fast reactor because Pb has a small neutron absorption cross section and does not affect the neutron flux. However, Pb has a disadvantage of the relatively high melting point of 325° C. Another effective candidate for the coolant is Pb—Bi (45.5% Pb-55.5% Bi) that can lower the melting point. The melting point of Pb—Bi is lowered to 125° C. Meanwhile, another prospective candidate for the primary coolant is Sn which has the melting point of 232° C. and the boiling point of 2602° C.

(2-3) Surface-Area-to-Volume Ratio of Nuclear Reactor

The amount of neutrons to be generated depends on the volume of the nuclear reactor while the neutron leakage amount depends on the surface area of the nuclear reactor. That is to say, the proportion of the leaking neutrons depends on a surface-area-to-volume ratio of the nuclear reactor. As the proportion of the surface area is larger, the proportion of the leaking neutrons grows larger.

Further, the amount of neutrons to be generated also depends on the concentrations of nuclear fissile Pu and U contained in the metal fuel rods.

The nuclear reaction of the nuclear fuel constituting the reactor core can be controlled by using the heat characteristics and thermal deformation of the reflector depending on the change in amount of neutrons as described above (PTL1).

The present invention relates to a reactor core structure of a nuclear reactor applying load-following control which loads metal fuel rod assemblies, and moreover, to a structure of a nuclear reactor incorporating a load-following control mechanism that utilizes thermal expansion of either a liquid like a liquid metal or a gas, which has a higher thermal expansion rate than those of solids.

A relation between the thermal expansion of the liquid metal and criticality characteristics of the nuclear fuel will be described to begin with. The criticality characteristics depend on the following factors:
(1) neutron flux;
(1-1) neutron generation probability;
(1-2) neutron leakage probability and reduction in leakage probability by reflector;
(1-3) neutron absorption probability, neutron absorber, and neutron flux;
(2) nuclear fissile substance concentration;
(2-1) nuclear fissile substance concentration such as U and Pu in nuclear fuel rods; and
(2-2) virtual nuclear fissile substance concentration by changing internal distance of fuel assemblies.

Regarding (1), it is easy to physically increase the nuclear fissile substance concentration. However, the increase in concentration enables production of a nuclear weapon. To prevent the nuclear weapon production, the United States limits the nuclear fissile substance concentration to 20% or less. In addition, the present invention is directed to the reactor core applying the load-following control mode. Specifically, the present invention is directed to the mechanism configured such that the nuclear reactivity is decreased by a natural phenomenon when the nuclear reactivity in the reactor core is increased, and on the other hand, that the nuclear reactivity is increased by the natural phenomenon when the nuclear reactivity in the reactor core is decreased. The natural phenomenon applied hereto is the thermal expansion of the material. The structural materials thermally expand or thermally contract depending on the change in temperature of the reactor core. The nuclear reactivity is controlled by changing the nuclear fissile substance concentration by using the above-mentioned thermal expansion and thermal contraction of the structural materials, and by changing the neutron flux.

(Control of Neutron Flux by Using Thermal Expansion/Thermal Contraction)

As disclosed in PTL1, reflector efficiency is changed by a deformation of a reflector using thermal expansion of a solid-state reflector support installed around fuel assemblies. For example, a spiral/coiled support is fitted on a support structure. By increasing dimensions of the support by adopting the aforementioned shape, it is possible to increase a thermal expansion amount and thus to increase a thermal expansion change rate. In the present invention, a liquid metal or a gas is used as another method of increasing the amount of thermal expansion/thermal contraction. In order to efficiently conduct the load-following control, it is desirable to increase the thermal expansion rate as high as possible. An important point here is that the thermal expansion rate include a linear expansion rate $\alpha$ and a volume expansion rate $\beta$. Moreover, the rates $\alpha$ and $\beta$ have a relation which is approximately expressed by the following formula:

$$\beta = 3\alpha. \tag{Formula 2}$$

This formula shows that the linear expansion rate can be increased by using a mechanism that transforms the volume expansion rate into the linear expansion rate.

FIG. 1 shows an example of a transformation mechanism based on this concept. As shown in FIG. 1, a piston 1 is inserted into a cylinder 2 and a reflector fitting jig 4 and a reflector fixing jig 5 are fitted on the piston 1. In order to prevent the leakage of the liquid or the gas, any of molybdenum disulfide ($MoS_2$), copper (Cu), and graphite having a lubrication function and a leakage prevention function may be used as a lubricant between the cylinder 2 and the piston 1.

The linear expansion amount is important in order to efficiently move the reflector. In order to further increase the linear expansion amount, a liquid metal tank 30 as shown in FIG. 1 is provided, and moreover, a volume of a member to be subjected to a volume expansion, such as a capacity of a tank for the liquid metal or the gas is increased. Thus, the linear expansion amount can be increased. Assuming that the capacity of the tank 30 is V, the cross-sectional area of the piston 1 is S, and a difference in temperature is $\Delta t$, an amount $\delta$ of movement of the piston is expressed by the following formula:

$$\delta = \beta \Delta t V / S. \tag{Formula 3}$$

Here, V is equivalent to a sum of a liquid metal volume V1 inside the cylinder and a liquid metal capacity V2 inside the auxiliary tank:

$$V = V1 + V2. \tag{Formula 4}$$

As described above, the amount $\delta$ of movement of the piston is increased by increasing the capacity of the liquid metal tank while reducing the cross-sectional area of the piston. As a consequence, an amount of movement of the reflector is increased.

FIG. 2 shows an example of a reflector movement mechanism in which a thermal expansion mechanism provided with the pistons and the cylinders as shown in FIG. 1 is connected to split reflectors. Each piston 1 is connected to a corresponding split reflector 10 through the reflector fixing jig 5. Furthermore, each cylinder 2 is fixed to a reflector movement mechanism fixation cylinder 11. The liquid metal or the gas is put in the cylinder 2. A bellows 15 is provided in order to prevent the leakage of the liquid metal or the gas to the outside. Along with an increase in expansion amount of the liquid metal or the gas inside the cylinder 2, the piston 1 in the cylinder 2 is moved outward. As a consequence, the reflectors 10 composed of six split pieces are moved outward. In consideration of environmental factors of the nuclear reactor such as radiation of the neutrons, etc. and the high temperature, prospective candidates for the liquid metal include mercury (Hg), sodium (Na), potassium (K), lead (Pb), and lead-bismuth (Pb—Bi). Moreover, candidates for the gas include helium (He), argon (Ar), and the like. Meanwhile, the thermal expansion coefficient of a container to contain the liquid metal or the gas needs to be set as small as possible. In this regard, examples of the material for the container include carbon (C), silicon carbide (SiC), silicon nitride (SiN), nickel steel, and tungsten steel.

A specific configuration of a small nuclear power generation system of the present invention is as follows:

a small nuclear power generation system including:
a reactor core including multiple fuel assemblies, in which
each fuel assembly is formed from multiple fuel rods each prepared by enclosing a metallic fuel into a cladding tube, the metallic fuel containing one or both of uranium (U)-235 and U-238, and
plutonium (Pu)-239;
a nuclear reactor vessel housing the reactor core;
a primary coolant including any one of metallic sodium (Na), lead (Pb), tin (Sn), and lead-bismuth (Pb—Bi), the primary coolant being put in the nuclear reactor vessel and heated by the reactor core; and a small nuclear reactor including
a neutron reflector arranged around the reactor core in a surrounding fashion, and at least one of a neutron reflector movement mechanism and a fuel assembly interval adjustment mechanism, which are provided in order to control a nuclear reaction in the reactor core, in which
the neutron reflector has neutron reflection efficiency which establishes a critical state in the core reactor while maintaining an effective multiplication factor of neutrons radiated from the reactor core equal to or above unity,
each of the neutron reflector movement mechanism and the fuel assembly interval adjustment mechanism includes a mechanism containing any of a liquid and a gas, which has a larger expansion rate than an expansion rate of the neutron reflector, and being configured to convert an amount of volume thermal expansion of any of the liquid and the gas into an amount of linear thermal expansion of any of the liquid and the gas,
the reflector movement mechanism is joined to the neutron reflector and configured to change an interval between the neutron reflector and the reactor core by a displacement attributed to thermal expansion converted into the amount of linear thermal expansion corresponding to a temperature in the nuclear reactor vessel and thereby to change the neutron reflection efficiency,
the fuel assembly interval adjustment mechanism is joined to a member to set an interval between the multiple fuel assemblies in the reactor core and configured to change the interval between the fuel assemblies by the displacement attributed to the thermal expansion converted into the amount of linear thermal expansion corresponding to the temperature in the nuclear reactor vessel and to change a neutron effective multiplication factor by using the changed interval, and
load-following control depending on the temperature is enabled by at least one of the neutron reflector movement mechanism and the fuel assembly interval adjustment mechanism.

Moreover, the metallic fuel may be a U—Pu-zirconium (Zr) ternary metallic fuel in which the ratio of a sum of U-235 and Pu-239 is equal to or below 20%.

Meanwhile, the mechanism to convert the amount of volume thermal expansion of any of the liquid and the gas into the amount of linear thermal expansion of any of the liquid and the gas may be a mechanism including: a cylinder-like container in which any of the liquid and the gas is injected; and a piston-like member inserted into the container so as to confine any of the liquid and the gas to the container.

Further, a bellows to prevent a leakage of any of the liquid and the gas may be fitted between the cylinder-like container and the piston-like member.

Alternatively, any of molybdenum disulfide, copper, and graphite may be provided between the cylinder-like container and the piston-like member as a lubricant having a lubrication function and a leakage prevention function to prevent a leakage of any of the liquid and the gas.

The liquid having the larger expansion rate can be a liquid metal selected from the group consisting of lithium (Li), potassium (K), sodium (Na), mercury (Hg), lead (Pb), lead-bismuth (Pb—Bi), gallium (Ga), and zinc (Zn). Meanwhile, the gas having the larger expansion rate can be any of helium (He) and argon (Ar).

Meanwhile, in addition to the mechanism to convert the amount of volume thermal expansion into the amount of linear thermal expansion by using the cylinder-like container and the piston-like member, the small nuclear power generation system can include a mechanism configured to convert a larger amount of volume thermal expansion into an amount of linear thermal expansion by joining a tank to the cylinder-like container, the tank having a larger capacity than the capacity of the cylinder-like container.

The small nuclear power generation system of the present invention performs load-following control while controlling intervals between the neutron reflectors and the fuel assemblies by: arranging a reflector movement mechanism fixation cylinder on an outer periphery of the neutron reflectors surrounding the reactor core, being split into two or more pieces in a circumferential direction, and having a substantially cylindrical shape; joining the cylinder-like containers or a combination of the cylinder-like containers and the tank to the reflector movement mechanism fixation cylinder, the cylinder-like containers measuring equal to or more than the number of splits of the neutron reflectors, and confining any of the liquid and the gas; joining the cylinder-like containers or a combination of the cylinder-like containers and the multiple piston-like members to the neutron reflectors, each piston-like member penetrating the tank; and moving each neutron reflector relative to the reflector movement mechanism fixation cylinder by an amount of linear thermal expansion corresponding to a change in temperature.

The small nuclear power generation system of the present invention performs load-following control while controlling intervals between the neutron reflectors and the fuel assemblies by: installing the multiple cylinder-like containers and a tank for any of the liquid and the gas on inside of the neutron reflectors surrounding the reactor core, being split into two or more pieces in a circumferential direction, and having a substantially cylindrical shape, in which the cylinder-like containers are joined to the split neutron reflectors and allow insertion of the multiple piston-like members, respectively, the piston-like members being arranged radially from the center of the reactor core, and the tank for any of the liquid and the gas is located at the center of the radially arranged cylinder-like containers; confining any of the liquid and the gas to the tank and the multiple cylinder-like containers; and moving each neutron reflector in a radial direction by an amount of linear thermal expansion corresponding to a change in temperature.

Another small nuclear power generation system of the present invention includes:
the substantially cylindrical neutron reflectors, being split into two or more pieces in a circumferential direction, being further split into two pieces in a radial direction, being further split into two or more pieces in a height direction, and having shapes of multiple rings, in which, in each of two groups of the ring-shaped reflectors on outside and the ring-shaped reflectors on inside, the reflectors are arranged in a staggered manner in the height direction so as not to overlap one another when viewed in a lateral direction, and the neutron reflectors as a whole surround the reactor core; and
a reflector movement mechanism including cylinder-like containers respectively provided with piston-like members being movable in a vertical direction, and a tank establishing fluid communication with the cylinder-like containers, in which the small nuclear power generation system performs load-following control by fixing the piston-like members to the group of the ring-shaped reflectors on the outside, fixing the group of the ring-shaped reflectors on the inside to the tank, confining any of a liquid or a gas to the cylinder-like containers and to the tank, moving the group of the ring-shaped reflectors on the outside in the vertical direction by an amount of linear thermal expansion of any of the liquid and the gas corresponding to a change in temperature by using the piston-like members, forming a slit between the group of the ring-shaped reflectors on the outside and the group of the ring-shaped reflectors on the inside, and controlling a leakage amount of neutrons by use of a clearance of the slit.

Still another small nuclear power generation system of the present invention performs load-following control of the reactor core by: arranging the multiple fuel assemblies substantially concentrically and dividing the fuel assemblies into concentric groups; arranging a tank and multiple cylinders into which pistons are inserted, respectively, at least at any of an upper part and a lower part of the fuel assemblies; arranging the multiple cylinders radially while defining the tank as the center; confining any of a liquid and a gas to the cylinders and the tank, the cylinders and the tank establishing fluid communication with one another; connecting the pistons to the concentric groups, respectively; and moving each concentric group of the fuel assemblies in a radial direction by an amount of linear thermal expansion of any of the liquid and the gas corresponding to a change in temperature.

The neutron reflector arranged around the reactor core in a surrounding fashion may be formed at a height smaller than a height dimension of the reactor core, and may be rendered movable from a lower side to an upper side of the reactor core or from the upper side to the lower side of the reactor core by using the movement mechanism.

Alternatively, the neutron reflector having a length equivalent to a total length of the fuel assemblies may be installed around the fuel assemblies.

In the small nuclear power generation system of the present invention, a cylinder made of a metal and having a primary coolant natural circulation promotion function and a neutron leakage prevention function may be arranged in the nuclear reactor vessel and around the fuel assemblies to which any of the reflector movement mechanism and the fuel assembly interval adjustment function is fitted, and a heat exchanger configured to perform heat exchange between the primary coolant and the secondary coolant may further be arranged around the cylinder.

In the mall nuclear power generation system of the present invention, a neutron absorber may be installed at a central part of the fuel assemblies.

Alternatively, a neutron absorber may be installed on outside of the neutron reflector. Meanwhile, a material suitable for disposal of nuclear waste and the like such as an actinoid-based radioactive element may be used as the neutron absorber.

The reactor core of the present invention includes the multiple fuel rods each prepared by enclosing the metallic fuel into the cladding tube. Here, the metallic fuel includes any one of: an alloy made of Zr, U-235, U-238, and Pu-239; and an alloy made of Zr and any of U-235 and U-238, and Pu. Meanwhile, the cladding tube includes any of ferrite stainless steel and chromium-molybdenum steel.

The nuclear reactor vessel of the present invention is formed into a cylindrical shape having a diameter equal to or below 5 m and a height equal to or below 20 m, and the reactor core to be housed in the nuclear reactor vessel includes the multiple fuel rods each formed with a diameter in a range from 5 to 15 mm and a length equal to or below 3.0 m.

The small nuclear power generation system of the present invention includes: a main heat exchanger configured to receive supply of the primary coolant through pipes, the primary coolant being heated by the nuclear reactor, and to circulate the secondary coolant to be heated by being subjected to heat exchange with the primary coolant, the secondary coolant being made of any of supercritical carbon dioxide, subcritical carbon dioxide, light water, and helium; and the turbine power generation system to be driven by the secondary coolant heated by the main heat exchanger. Here, the main heat exchanger and the turbine power generation system are provided outside the nuclear reactor.

In another small nuclear power generation system of the present invention, the primary coolant is put in the nuclear reactor, and the turbine power generation system is provided outside the nuclear reactor, the turbine power generation system being configured to be driven by the secondary coolant heated by the heat exchanger in the nuclear reactor vessel, the heat exchanger being heated by the fuel in the nuclear reactor vessel and by the primary coolant heated by the fuel in the nuclear reactor vessel.

The secondary coolant may be any of mercury (Hg) and light water.

A group of secondary coolant inlet pipes of the multiple heat exchangers installed in the nuclear reactor may be connected to a first manifold, and a group of secondary coolant outlet pipes thereof may be connected to a second manifold.

In still another small nuclear power generation system of the present invention, multiple tubes, each of which includes a thermoelectric element having a thermoelectric power generation function and being fitted to an inner surface of the tube, are installed around the reactor core, in which any of the fuel assemblies and the fuel assemblies being equipped with the fuel assembly interval adjustment mechanism are loaded in the center of the neutron reflector joined to the movement mechanism. Meanwhile, the primary coolant is put in the nuclear reactor, and the second coolant is supplied to the multiple tubes.

The thermoelectric element is formed from any one of: lead-tellurium based (Pb—Te based) semiconductor; silicon-germanium based (Si—Ge based) semiconductor; filled skutterudite based semiconductor made of a La—Fe—Sb alloy for a p-type and a Ce—Co—Sb alloy for an n-type; oxide-metal based semiconductor; and oxide based semiconductor made of an oxide of Ca—Co for the p-type and an oxide of any of Ca and Mn for the n-type.

Advantageous Effects of Invention

The nuclear reactor for the small nuclear power generation system of the present invention adopts the physical safety system such as the neutron reflector movement mechanism and the fuel assembly interval adjustment mechanism that utilize thermal expansion or thermal contraction. Thus, the present invention can provide a small and low-cost nuclear reactor system.

DESCRIPTION OF EMBODIMENTS

Embodiments of the present invention are based on results obtained by use of the standard reactor analysis code (SRAC). The SRAC is a reactor analysis code system which is applicable to reactor core analyses of various types of nuclear reactors.

First, a nuclear reaction was confirmed based on basic specifications of a reactor core of a small nuclear reactor shown below:

(Basic Specifications)
reactor core diameter: 85 cm;
reactor core height: 200 cm;
number of fuel assemblies: 60; and
fuel pin diameter: 1 cm.

Now, embodiments of small nuclear reactors of specific shapes will be described based on results of criticality calculations conducted on the embodiments and with reference to the drawings.

Embodiment 1

Figure 3:
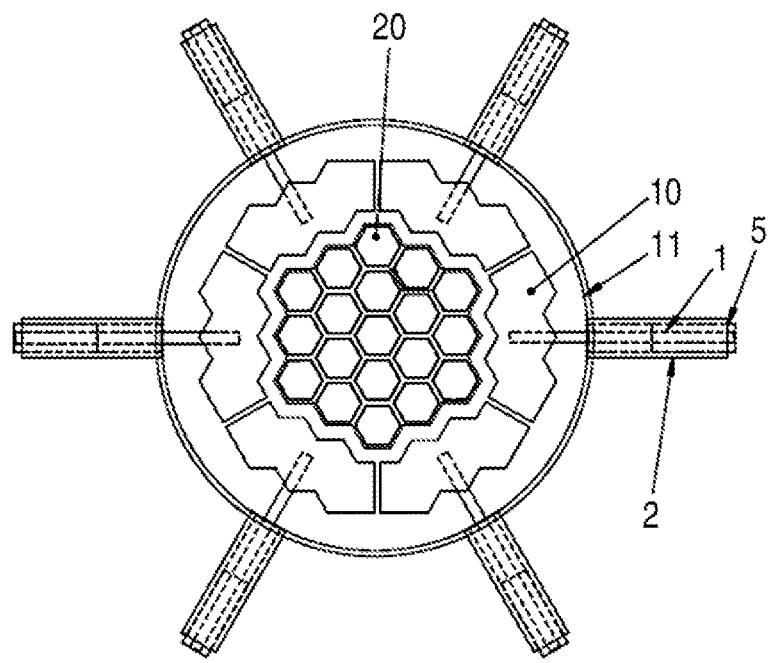
FIG. 3 is a perspective top plan view of an embodiment of a reactor core of a small nuclear reactor of the present invention.

FIG. 3 shows a schematic cross-sectional structure of a small nuclear reactor according to Embodiment 1 of the present invention. Fuel assemblies 20 are loaded in a nuclear reactor vessel made of low alloy steel or the like, and split neutron reflectors 10 made of graphite are installed around the fuel assemblies. These reflectors can be moved from bottom up or moved from top down. In order to move the reflectors in a lateral direction, the reflector movement mechanism fixation cylinder 11 is installed as a reflector support mechanism, and liquid metal cylinders 2, reflector fixing jigs 5, and pistons 1 are fitted thereon. The split reflectors and the reflector support mechanism are connected to a drive mechanism (not shown) installed at an upper part of the nuclear reactor. However, the present invention is not limited to this configuration, and reflectors having a length equivalent to the total length of the fuel assemblies may be installed around the fuel assemblies.

Figure 4:
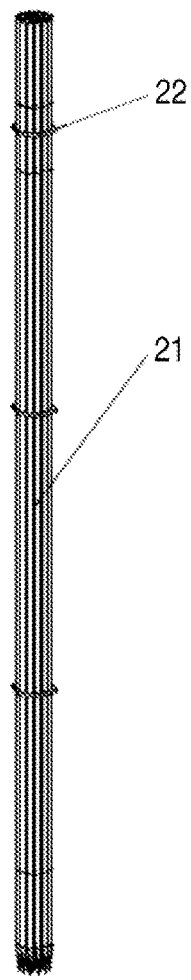
FIG. 4 is a view showing external appearance of a fuel assembly.

FIG. 4 shows the external appearance of the fuel assembly 20. The fuel assembly 20 was formed by bundling twenty-four fuel rods 21 by using spacers 22, in which each fuel rod 21 is produced by inserting a fuel pin being made of Pu—U—Zr alloy steel and having a diameter of 10 mmϕ and a length of 200 mm into a cladding tube made of ferrite stainless steel (HT-9 steel (Fe-12CHMo-V, W) being a sort of reference steel of ferrite steel materials). As in the model nuclear reactor shown in FIG. 3, ninety-three or more sets of the fuel assemblies 20 were loaded in the split reflectors. The concentration of nuclear fissile substances being a sum of Pu-239 and U-235 was set to 19%.

Figure 5:
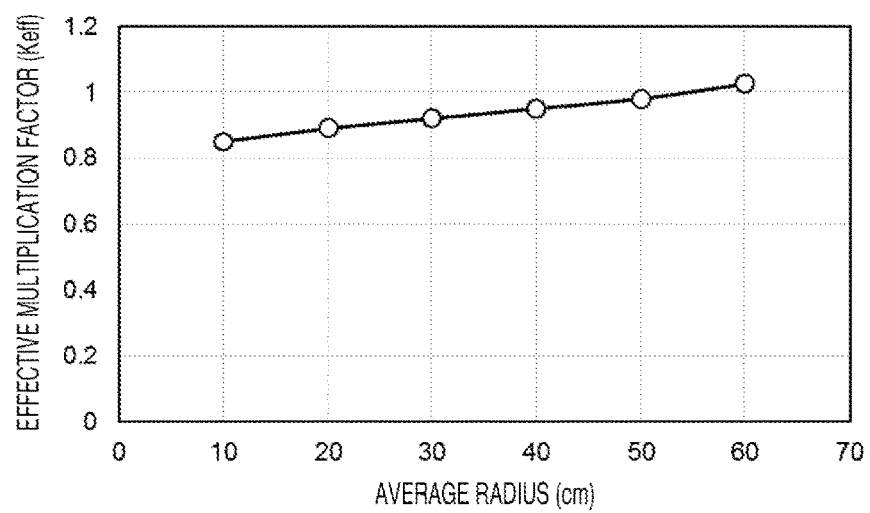
FIG. 5 is a graph showing a relation of an average reactor core radius of the fuel assemblies with an effective multiplication factor according to the present invention.
Figure 6:
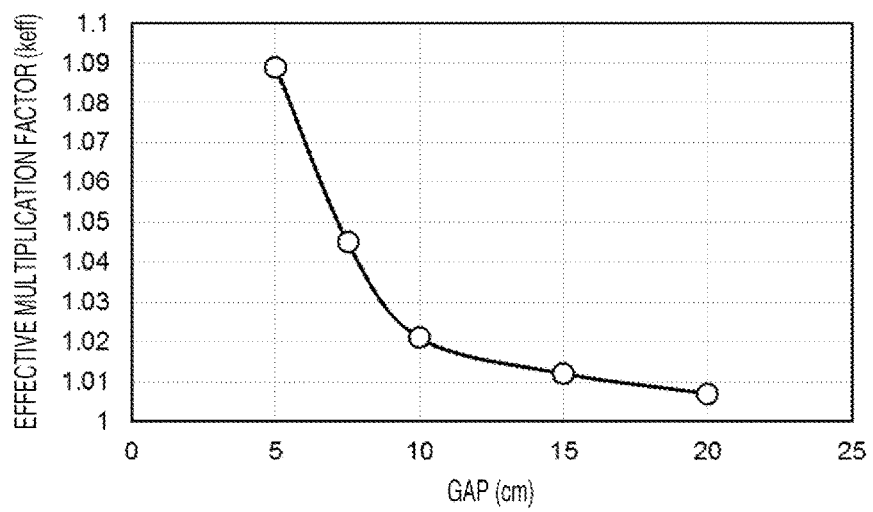
FIG. 6 is a graph showing a relation of the effective multiplication factor with an average gap between the reactor core and reflectors according to the present invention.

FIG. 5 shows a relation of an average reactor core dimension with a neutron effective multiplication factor ($K_{eff}$). As can be seen from this drawing, when the average radius of the reactor core grows larger, the factor $K_{eff}$ tends to exceed 1. In the present invention, the radius of the reactor core is set to a value equal to or below 1 which is in a range from $K_{eff}$ approximately 1 to near 1, and $K_{eff} > 1$ is satisfied by use of the reflectors. FIG. 6 shows a relation of the neutron effective multiplication factor ($K_{eff}$) with an average distance (gap) between the reactor core and the reflectors. As can be seen from the drawing, the factor $K_{eff}$ becomes smaller as the reflectors recede from the fuel assemblies. On the other hand, the factor $K_{eff}$ grows larger as the gap becomes smaller. It is possible to control the factor $K_{eff}$ by using the movement of the position of each reflector depending on the temperature. In other words, this drawing shows that a rise in temperature of the reactor core increases the gap so as to lower the nuclear reaction temperature, and that a drop in temperature thereof decreases the gap so as to raise the nuclear reaction temperature. Hence, the load-following control is enabled.

Embodiment 2

The load-following control mode by using the reflectors has been described above. Next, a description will be given of the load-following control mode by changing intervals between the fuel assemblies.

Figure 7:
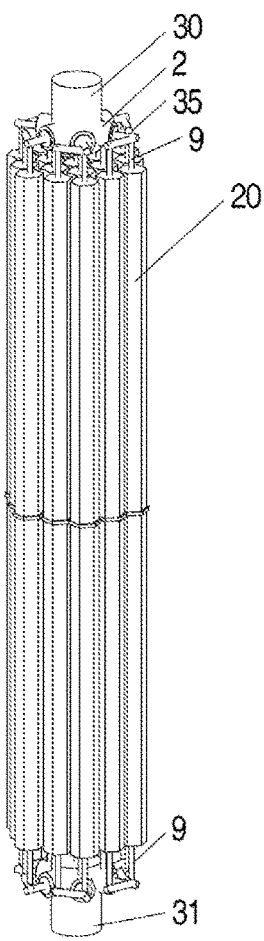
FIG. 7 is a view showing external appearance of the fuel assemblies and an interval adjustment mechanism according to the present invention.
Figure 8:
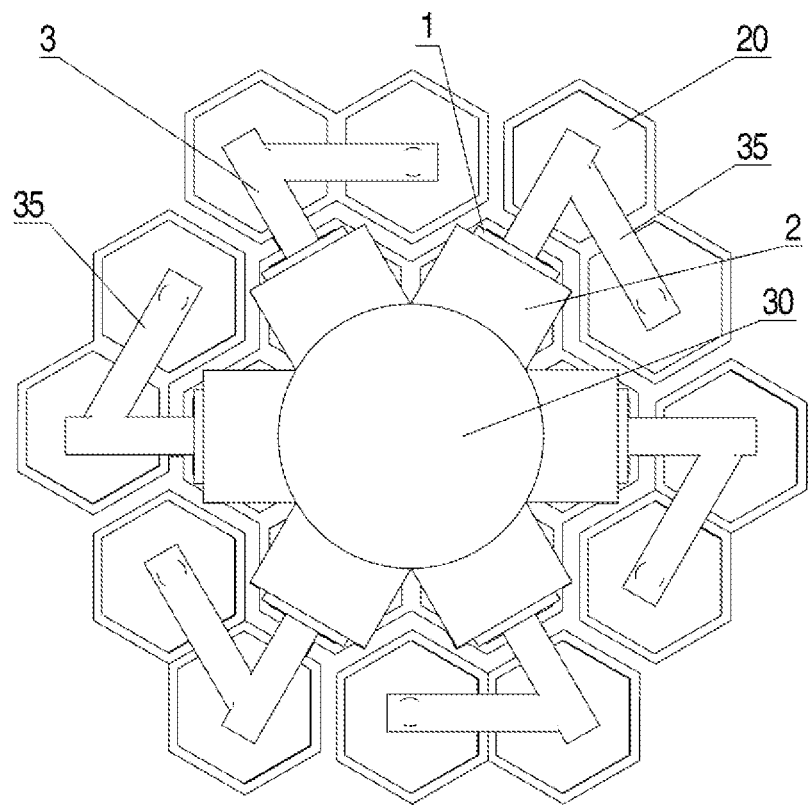
FIG. 8 is a top plan view of fuel assembly interval adjustment mechanisms according to the present invention.

FIG. 7 shows the external appearance of the fuel assemblies provided with fuel assembly position shifting mechanisms. FIG. 8 shows a plan view of the fuel assembly position shifting mechanisms to be fitted on upper parts and lower parts of the fuel assemblies, each of which is configured to change the interval between the fuel assemblies and the reactor formed from the fuel assemblies. Each fuel assembly movement mechanism fits the cylinders 2, the pistons 1, fuel assembly supports 9, and fuel assembly interlocking members 35 to any one of the liquid tank 30 and a lower liquid tank 31. Candidates for the liquid metal to be used in this embodiment include gallium (Ga), mercury (Hg), zinc (Zn), cadmium (Cd), lead (Pb), lead-bismuth (Pb—Bi), potassium (K), sodium (Na), lithium (Li), and tin (Sn), each of which liquefies at a temperature equal to or below 400° C. Among them, Hg, K, and Na are practically effective because of a high thermal expansion rate.

Figure 9:
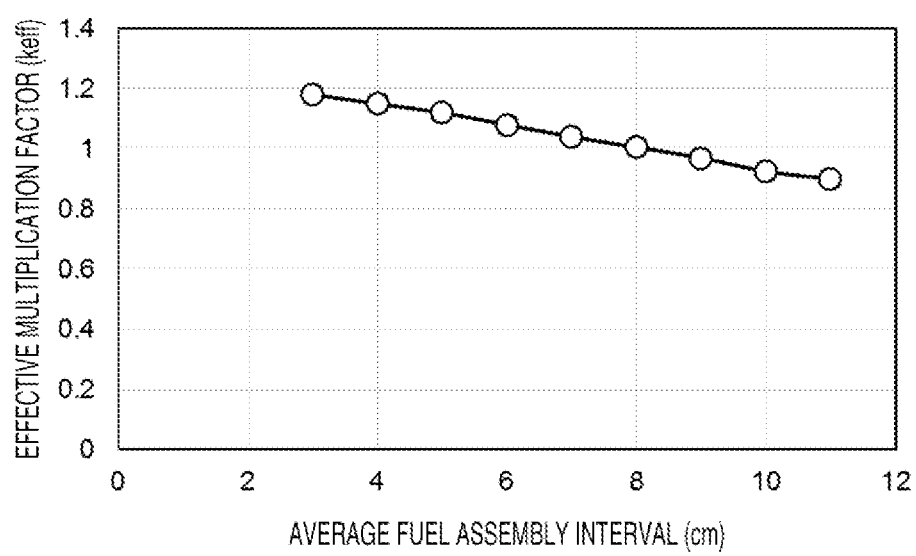
FIG. 9 is a graph showing a relation of the effective multiplication factor with an average fuel assembly interval according to the present invention.

FIG. 9 shows a relation of the effective multiplication factor $K_{eff}$ with a distance between a fuel assembly at an outer edge part of the reactor core and the fuel assembly at the central part. As can be seen from this drawing, the factor $K_{eff}$ is gradually reduced as the fuel assembly at the outer edge part recedes from the central part, thereby finally reaching subcritical.

Embodiment 3

Figure 1:
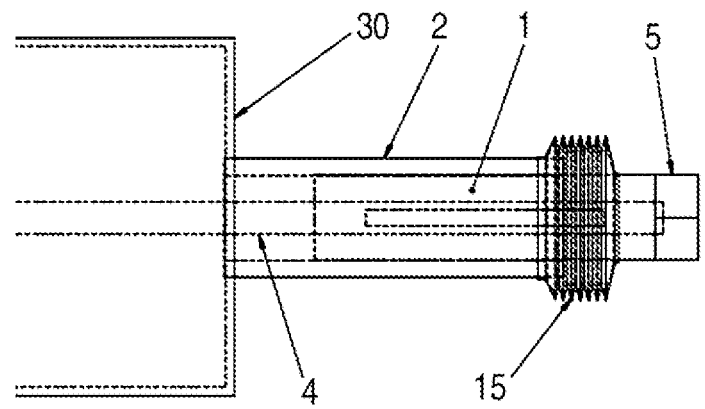
FIG. 1 is a perspective cross-sectional view showing a neutron reflector movement mechanism according to the present invention.
Figure 2:
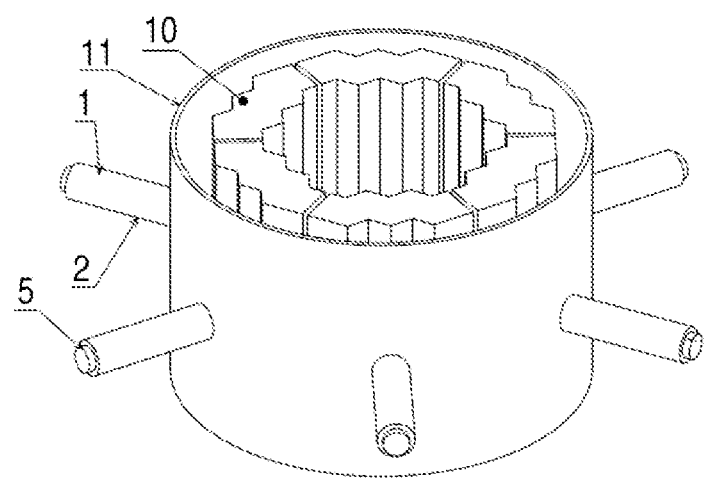
FIG. 2 is a schematic perspective view of a structure which combines neutron reflectors with the movement mechanisms according to the present invention.
Figure 10:
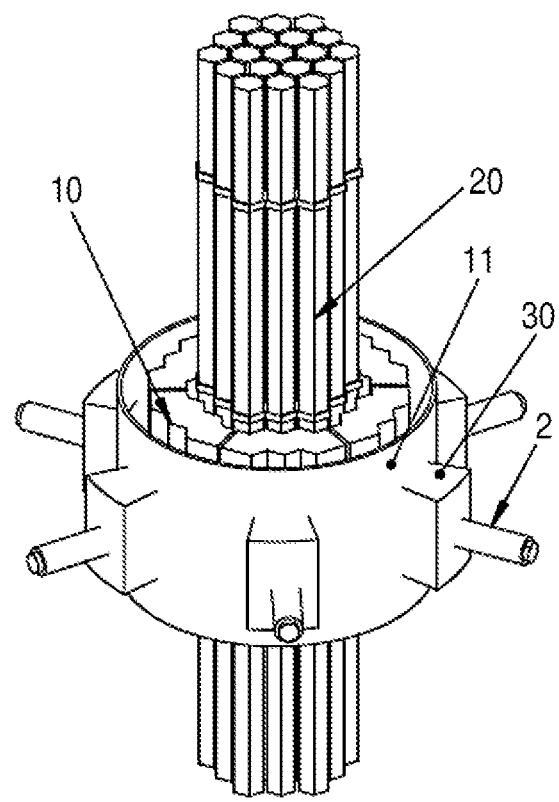
FIG. 10 is a schematic perspective view showing the external appearance of a reflector movement mechanism accompanied by a liquid tank and of the fuel assembly according to the present invention.

FIG. 10 shows an embodiment of a reflector movement mechanism applying liquid tanks and cylinders concurrently. The piston 1 and the reflector movement mechanism fixation cylinder 11 are attached to each split reflector 10. As shown in FIG. 1, the liquid tank 30 is integrated with the cylinder 2 into which the piston 1 is inserted. The integration of the cylinder with the liquid tank makes it possible to increase the capacity for the liquid metal used for the thermal expansion. An increase in amount of the total liquid metal leads to an increase in change rate (the amount of movement/the difference in temperature) of each reflector, and the load-following control becomes easier as a consequence.

In the case of this embodiment, it is possible to increase the length of operating time of the small nuclear reactor by moving the reflectors in the vertical direction along with the operating time. Specifically, a burning part of the nuclear fuel is moved by moving the reflectors from a lower part to an upper part of the fuel assemblies.

Embodiment 4

Figure 11A:
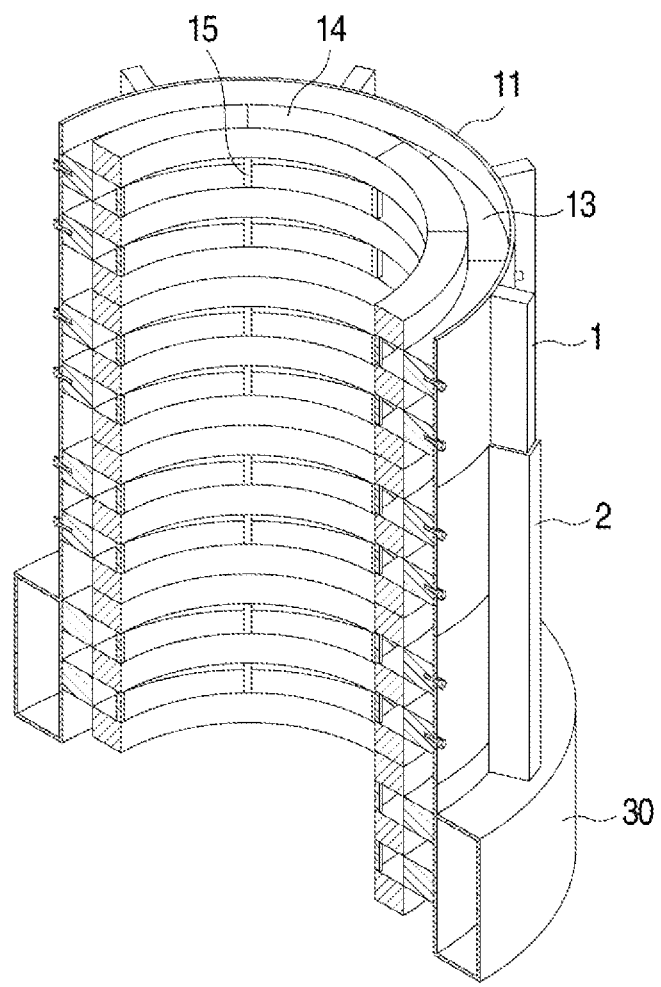
FIG. 11A is a schematic perspective view of the cross section of an embodiment of a reflector slit adjustment type reflector movement mechanism according to the present invention.
Figure 11B:
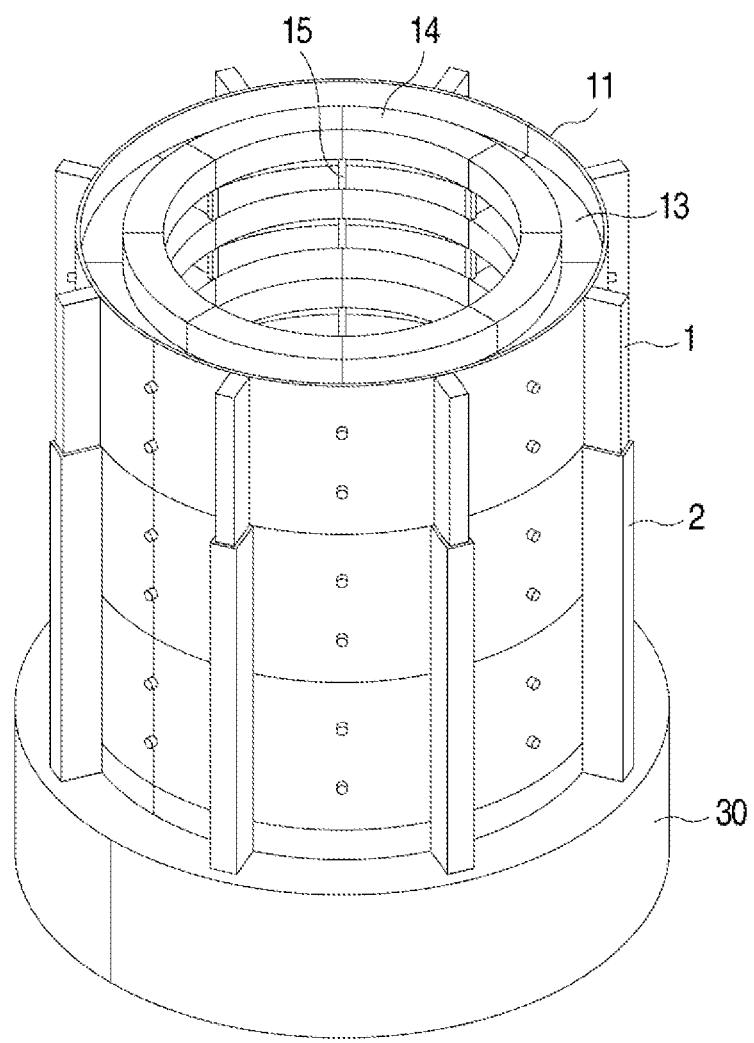
FIG. 11B is a schematic perspective view of the embodiment of the reflector slit adjustment type reflector movement mechanism according to the present invention.

FIGS. 11A and 11B show an embodiment of splitting the split reflectors into two or more pieces in a radial direction. The reflectors split in the radial direction are divided into inner split reflectors 14 and outer split reflectors 13. The inner split reflectors 14 and the outer split reflectors 13 are stacked in a staggered manner in a height direction. The inner split reflectors 14 are fixed to one another by using inner split reflector fixing jigs 15. The outer split reflectors 13 are joined to the reflector movement mechanism fixation cylinder 11. Moreover, the reflector movement mechanism fixation cylinder 11 is joined to the pistons 1. Each cylinder 2 that allows insertion of the piston 1 is integrated with the liquid tank 30. Further, although it is not illustrated, the inner split reflectors 14 and the liquid tank 30 are fixed to one another. With this structure, the outer split reflectors 13 are moved vertically by using the thermal expansion of the metal put in the liquid tank 30. This movement attributed to the liquid metal forms a slit between the inner split reflectors 14 and the outer split reflectors 13, which reduces reflection efficiency. The load-following control is enabled by using this mechanism.

Embodiment 5

Figure 12:
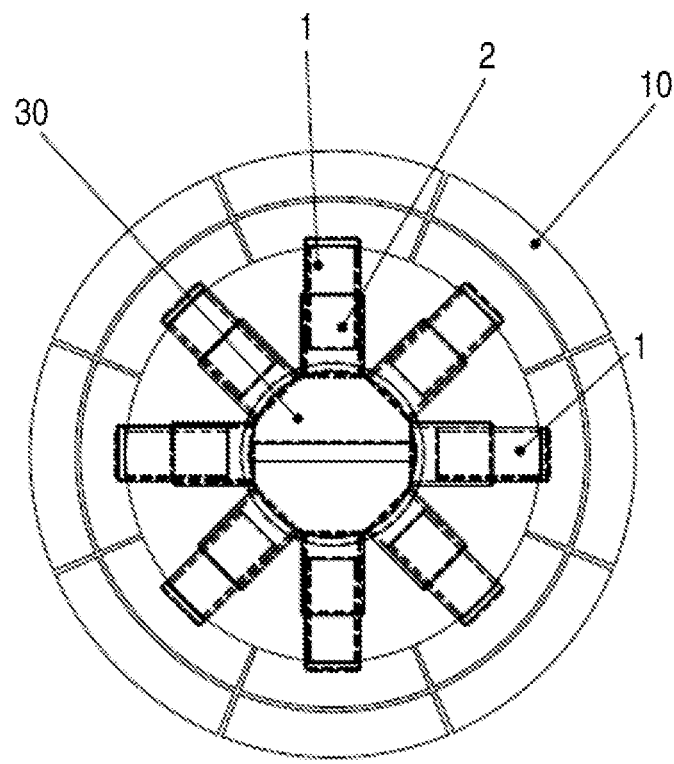
FIG. 12 is a perspective plan view of an embodiment of a reflector inward installation type reflector movement mechanism according to the present invention.

FIG. 12 shows an embodiment of a reflector structure in which a reflector movement mechanism using the liquid is built in the reflectors. Specifically, any of Hg, K, and Na that are the liquid metals is put in as the liquid. This embodiment represents a device example in which the reflector movement mechanism configured to use the thermal expansion of the liquid metal is built in the reflectors. A liquid metal movement mechanism is built in the reflectors 10 split into eight pieces. The liquid metal movement mechanism includes the liquid tank 30 at the center, and the eight cylinders 2 in which the pistons 1 are inserted, respectively, are fitted around the liquid tank 30. The pistons 1 are joined to the split reflectors 10. With this structure, the reflectors 10 are moved outward with an increase in temperature of the liquid metal and moved inward with a decrease in temperature thereof. As a consequence, the load-following control is enabled. The reflector structure of this embodiment is designed to be fitted on an upper part, a lower part, or both ends of the fuel assemblies, and it is therefore difficult to move the reflectors in the vertical direction. Accordingly, the reflectors need to have the height larger than that of the fuel assemblies.

Embodiment 6

Figure 13:
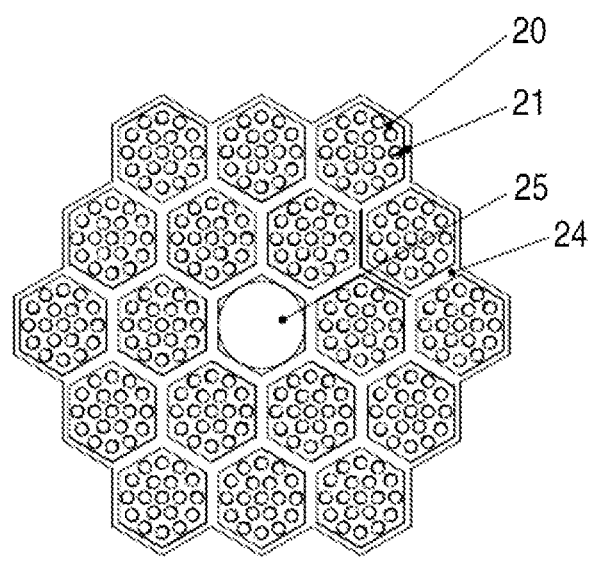
FIG. 13 is a cross-sectional view of the fuel assemblies according to the present invention.
Figure 14:
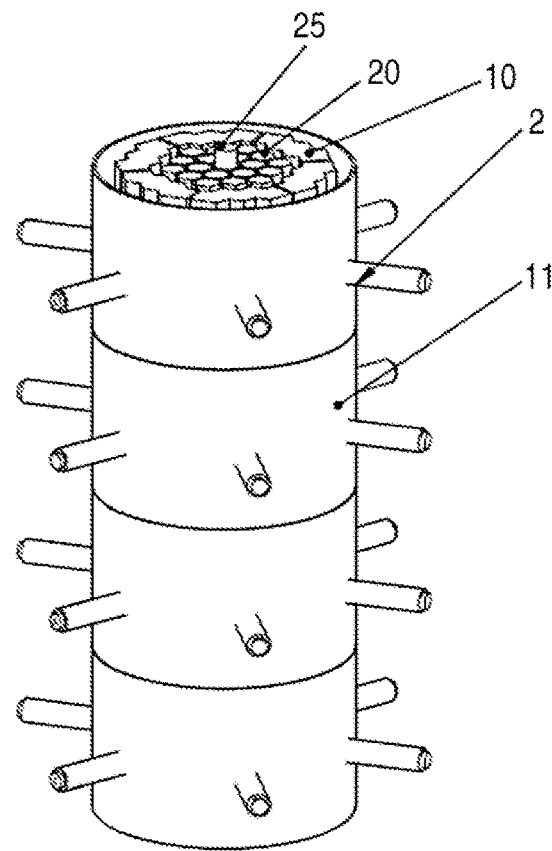
FIG. 14 is a schematic perspective view showing external appearance of the fuel assemblies and the reactor movement mechanism according to the present invention.
Figure 15:
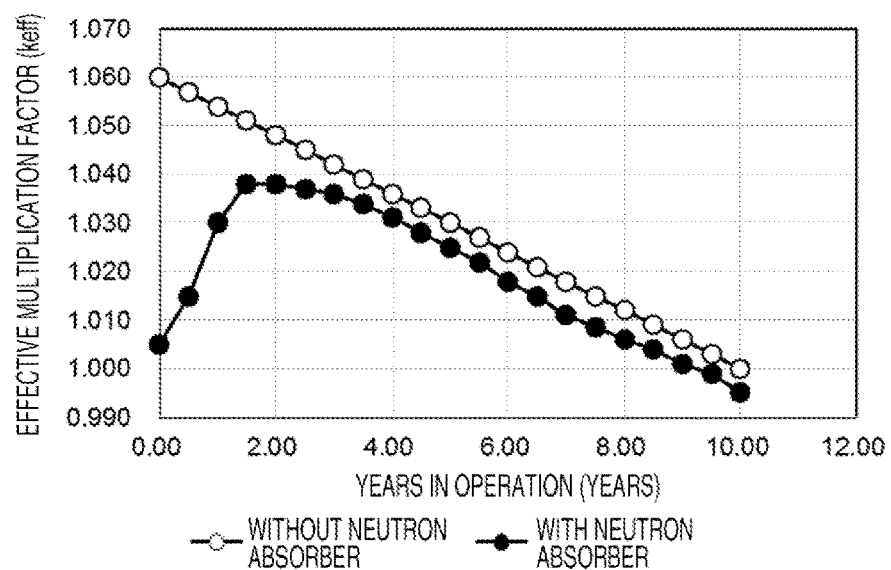
FIG. 15 is a graph showing a difference in operating time dependency of the effective multiplication factor in a nuclear power generation system according to the present invention, the difference being attributable to the presence and absence of a neutron absorber.

In the next embodiment, a description will be given of a method of achieving a longer operating life. First, as shown in FIG. 13, a neutron-absorbing rod 25 containing boron (B) and gadolinium (Gd) is loaded in a fuel assembly group 20 formed from the ninety-three fuel rods 21 as described above. FIG. 14 shows a state of loading the reactor core having the aforementioned structure into the reflector structure. In FIG. 14, the split reflectors 10 are loaded in the reflector movement mechanism fixation cylinder 11, and the cylinders 2 containing the liquid metal are joined to the reflector movement mechanism fixation cylinder 11 in order to move the split reflectors 10 in the radial direction. Nuclear characteristics of this structure were examined. The fuel assemblies provided with a margin for initial reactivity as shown in FIG. 13 were loaded in order to extend the operating time of the nuclear reactor. If the initial reactivity is large, there is a risk of an excessive progress in nuclear reaction which may lead to overheating. In this regard, it is possible to reduce excessive reactivity in an initial process by loading the neutron absorber 25 made of a flammable neutron poison and mixed with B10 at a high concentration of 20% or more as shown in FIG. 15. Another method of reducing the initial reactivity is a method of adding a neutron poison such as gadolinium oxide ($Gd_2O_3$) to the fuel rods.

Embodiment 7

Figure 16A:
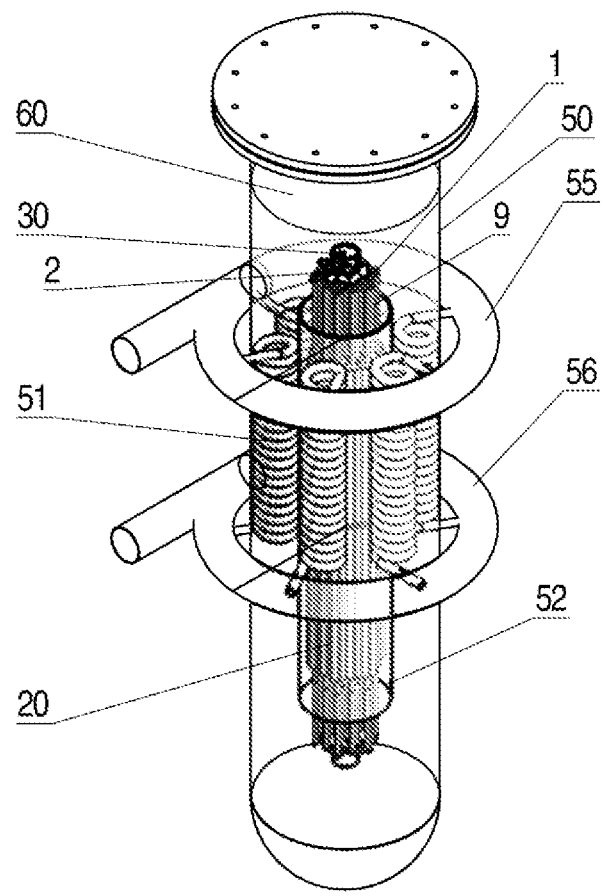
FIG. 16A is a transparent perspective view of a natural circulation type nuclear power generation system provided with an intra-reactor heat exchanger according to the present invention.
Figure 16B:
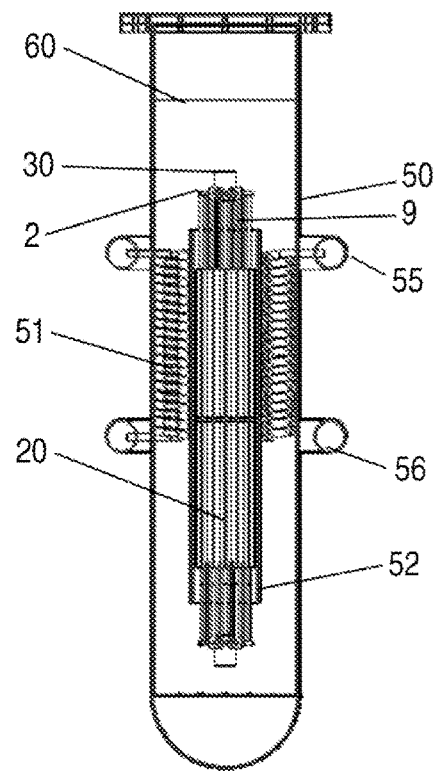
FIG. 16B is a vertical sectional view of the natural circulation type nuclear power generation system provided with the intra-reactor heat exchanger according to the present invention.

FIGS. 16A and 16B show an embodiment of a nuclear reactor system in which the fuel assemblies of the load-following control mode shown in FIG. 7 are installed in the nuclear reactor vessel. This system uses Pb—Bi as a primary coolant in the nuclear reactor vessel, and uses light water as a secondary coolant therein. The fuel assemblies 20 are loaded in a nuclear reactor vessel 50. As shown in FIGS. 7 and 8, the cylinders 2 joined to the liquid tank 30 and other components are connected to the fuel assemblies 20, and this structure has a mechanism in which intervals between the fuel assemblies are spread as a result of expansion of Hg that is the liquid metal put in the liquid tank 30. A natural circulation promotion cylinder 52 is installed around the fuel assemblies 20. This cylinder 52 has a chimney function and promotes natural circulation of the primary coolant. Moreover, by providing the cylinder 52 with the function of the reflector as well as the chimney function, it is possible to improve the criticality characteristics and to increase the burning life of each of the fuel assemblies. Furthermore, a heat exchanger 51 for performing heat exchange between the primary coolant and the secondary coolant is installed around the inner periphery of the nuclear reactor vessel 50. Further, multiple secondary coolant inlet pipes of this heat exchanger are connected to a secondary coolant inlet manifold 56. Then, multiple secondary coolant outlet pipes of the heat exchanger are connected to a secondary coolant outlet manifold 55.

Embodiment 8

Figure 17:
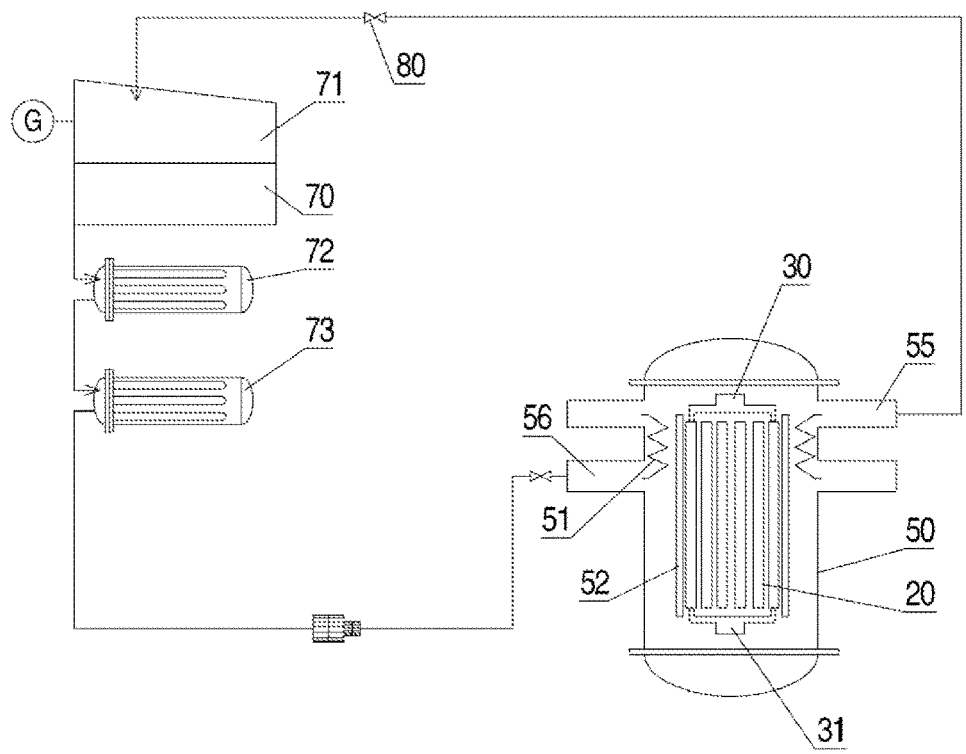
FIG. 17 is a schematic cross-sectional view showing an embodiment of the natural circulation type nuclear power generation system according to the present invention.

FIG. 17 shows an embodiment of a nuclear reactor system incorporating the nuclear reactor described in Embodiment 7. The configuration inside the nuclear reactor vessel 50 is the same as that of Embodiment 7. The fuel assemblies 20, the fuel assembly movement mechanism including the liquid tank 30 and the lower liquid tank 31 as main constituents, the natural circulation promotion cylinder 52, and the heat exchanger 51 are built in the nuclear reactor vessel 50. The secondary coolant inlet manifold 56 adaptable to the inlet pipes of the heat exchanger and the secondary coolant outlet manifold 55 adaptable to the output pipes thereof are installed around the nuclear reactor vessel 50. This embodiment uses water as the secondary coolant. The pipes connected to the secondary coolant outlet manifold 55 are coupled to a steam turbine 71, which is driven to generate electric power. The water transformed into a liquid with a condenser 70 combined with the steam turbine 71 is preliminarily heated by a first heater 72 and a second heater 73, and is then supplied to the heat exchanger 51 in the nuclear reactor vessel 50 through the coolant inlet manifold 56 by using a water supply pump 75. This embodiment represents the system configured to directly generate the steam inside the heat exchanger 51 by heating the secondary coolant in the nuclear reactor vessel, and to take the steam out of the secondary coolant outlet manifold 55, and to generate electric power by rotating the steam turbine.

Embodiment 9

Figure 18:
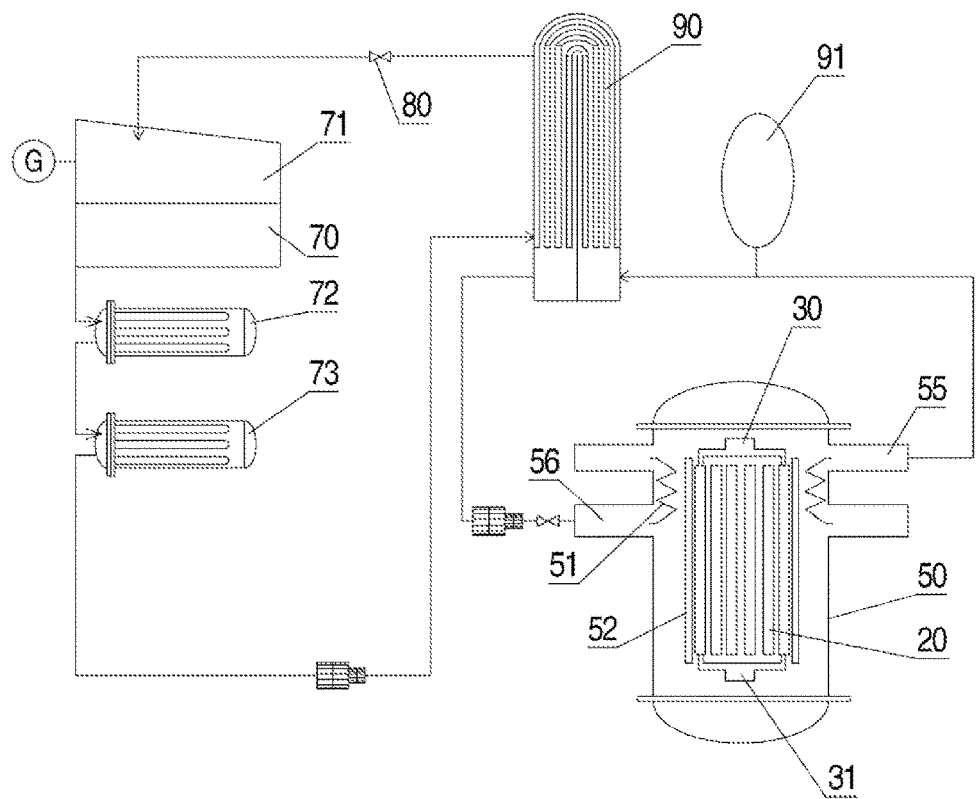
FIG. 18 is a schematic cross-sectional view showing another embodiment of the natural circulation type nuclear power generation system according to the present invention.

Another embodiment will be described by referring to FIG. 18. In this embodiment, the generation of the steam inside the nuclear reactor vessel is suppressed by using a pressurizer 91. First, the fuel assemblies 20, the fuel assembly movement mechanism including the liquid tanks 30 and 31 as main constituents, and the heat exchanger 51 are built in the nuclear reactor vessel 50. Moreover, the natural circulation promotion cylinder 52 for promoting a natural circulation flow of the primary coolant is installed around the fuel assemblies. The secondary coolant inlet manifold 56 adaptable to the inlet pipes of the heat exchanger in the nuclear reactor and the secondary coolant outlet manifold 55 adaptable to the output pipes thereof, which are provided in order to absorb the heat from the primary coolant (Bi—Pb) heated by the natural circulation, are fitted around the nuclear reactor vessel 50. This embodiment uses water as the secondary coolant. The pipes connected to the secondary coolant outlet manifold 55 are coupled to a main heat exchanger 90. Vapor of tertiary cooling water generated in the main heat exchanger 90 is connected to the steam turbine 71, and the turbine 71 is combined with the condenser 70. Thus, the turbine is driven for power generation. The tertiary cooling water transformed into a liquid with the condenser 70 is preliminarily heated by the first heater 72 and the second heater 73, and is then brought back to the main heat exchanger 90 by using the water supply pump 75. Secondary cooling water is supplied to the heat exchanger 51 in the nuclear reactor vessel 50 through the secondary coolant inlet manifold 56.

Embodiment 10

Figure 19:
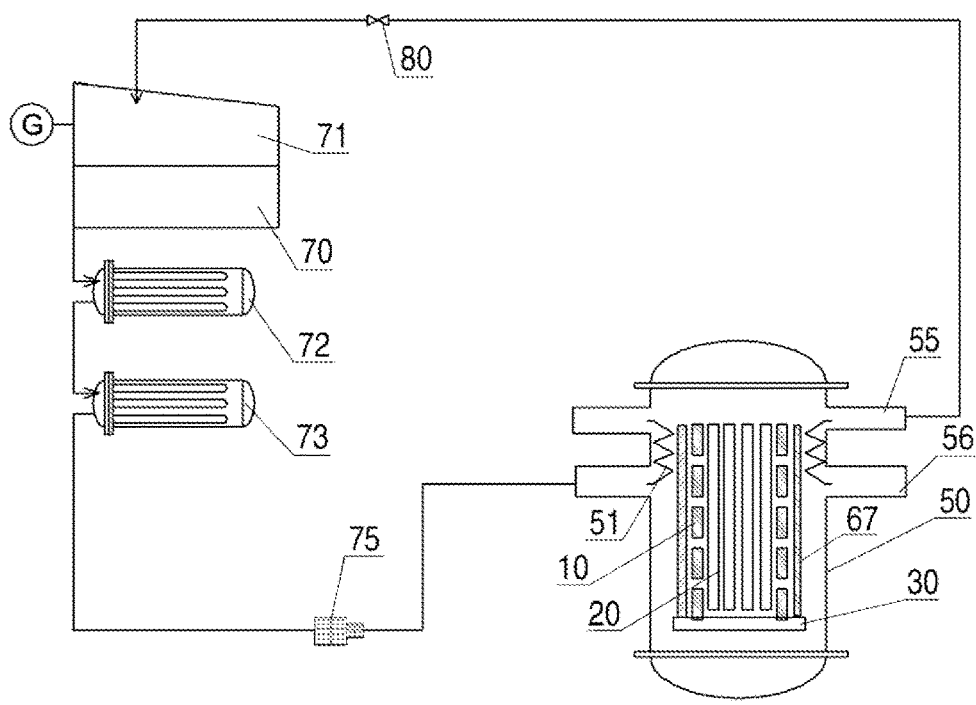
FIG. 19 is a schematic cross-sectional view showing an embodiment of a split reflector natural circulation type nuclear power generation system according to the present invention.

Embodiment 9 has described the system configured to heat the primary coolant of the liquid metal (Bi—Pb) by the natural circulation inside the nuclear reactor loading the fuel assemblies having a fuel assembly interval adjustment function. In this embodiment, the split reflectors 10 are installed around the fuel assemblies 20 as shown in FIG. 19. The split reflectors are controlled by use of expansion/contraction of the liquid metal put in the liquid tank 30. Moreover, a neutron-absorbing cylinder 67 designed to prevent neutrons leaking out of the reflectors from returning to the reactor core by reflection is provided on the outer periphery of the split reflectors in order to improve a reflector effect. This structure combining the neutron-absorbing cylinder 67 with the split reflectors also has a function to promote the natural circulation of the primary coolant. Water is used as the secondary coolant in FIG. 19. To heat the water, multiple heat exchangers 51 are installed in the nuclear reactor vessel 50. These heat exchangers 51 are connected to the secondary coolant inlet manifold 56 and the secondary coolant outlet manifold 55. The secondary coolant transformed into the steam inside the heat exchangers 51 is sent to the turbine 71, and the steam is transformed back to water with the condenser 70. The water is preliminarily heated by the first heater 72 and the second heater 73, and is then supplied to the heat exchangers 51 again by using the water supply pump 75.

Embodiment 11

Figure 20:
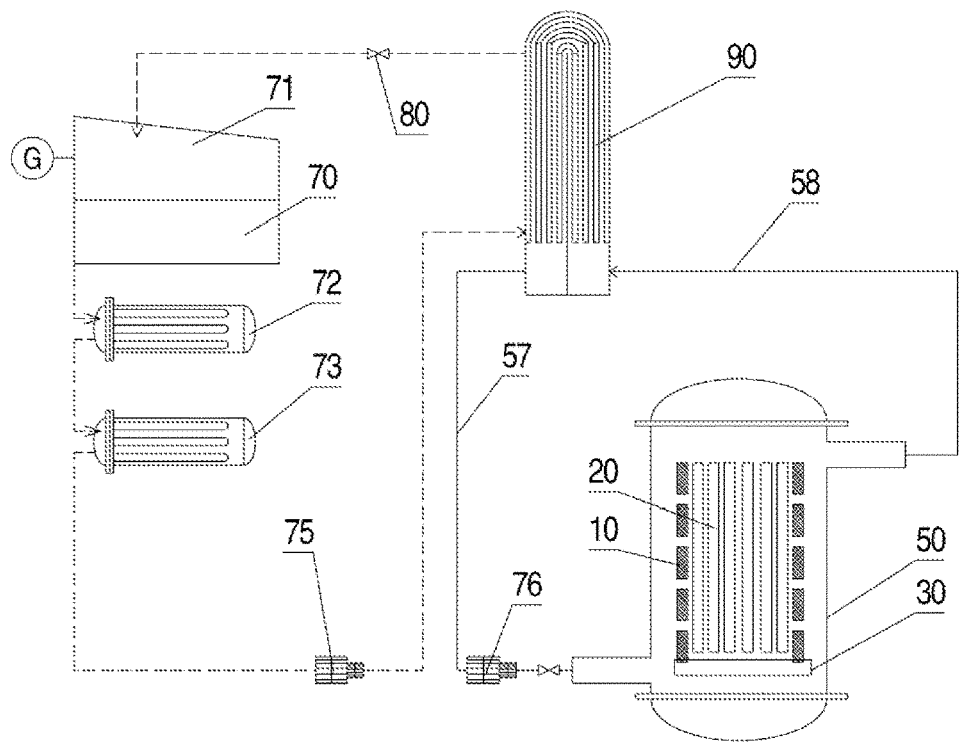
FIG. 20 is a schematic cross-sectional view showing another embodiment of a split reflector type small nuclear power generation system according to the present invention.

Next, an embodiment of a system configured to circulate the primary coolant (Bi—Pb) will be described by referring to FIG. 20. In FIG. 20, the fuel assemblies 20, and a split reflector movement mechanism 10 including the liquid tank 30 as a main constituent are built in the nuclear reactor vessel 50. A primary coolant return pipe 57 and a primary coolant outlet pipe 58 are fitted to the nuclear reactor vessel 50. This embodiment uses water as the secondary coolant. The heated primary coolant is supplied from the primary coolant outlet pipe 58 to the main heat exchanger 90. After the heat exchange, the primary coolant returns to the nuclear reactor vessel 50 through the return pipe 57. The steam generated by the main heat exchanger is connected to the steam turbine 71, and the steam drives the turbine 71 for power generation. The water transformed back to a liquid by the condenser 70 combined with the steam turbine 71 is preliminarily heated by the first heater 72 and the second heater 73, and is then supplied to the main heat exchanger 90 by using the water supply pump 75.

Embodiment 12

Figure 21:
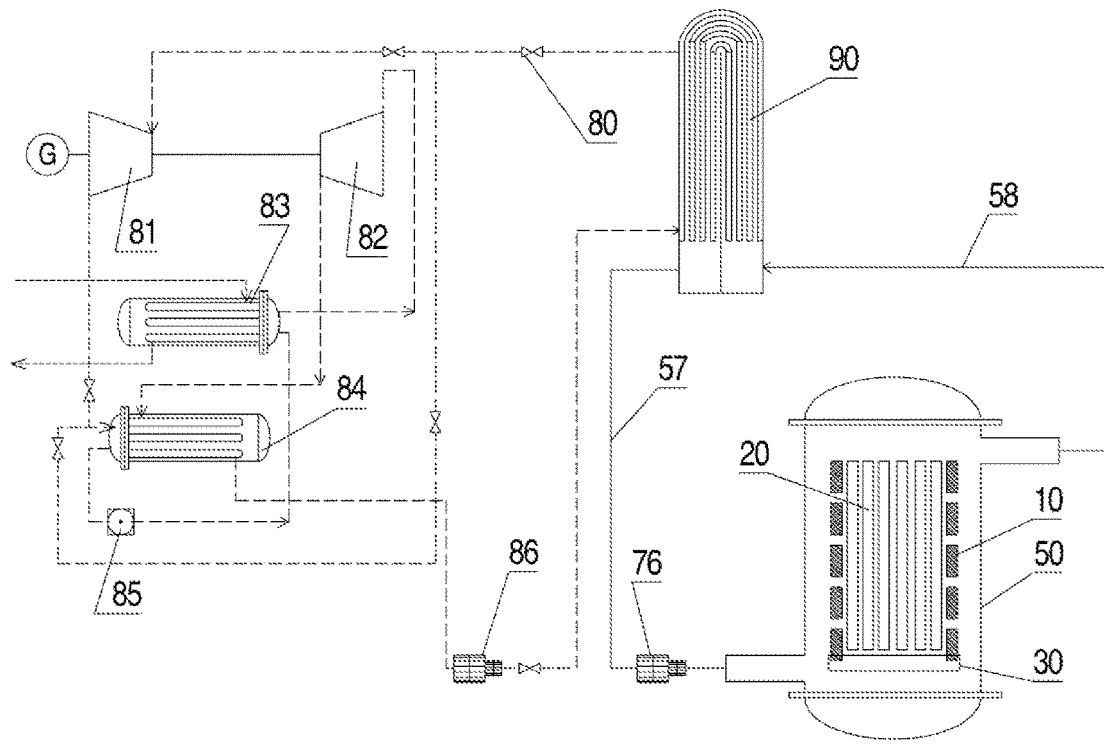
FIG. 21 is a schematic cross-sectional view showing an embodiment of a supercritical carbon dioxide gas turbine small nuclear power generation system according to the present invention.

Another embodiment of the system configured to circulate the primary coolant (Bi—Pb) will be described by referring to FIG. 21. In FIG. 21, the fuel assemblies 20, and the split reflector movement mechanism 10 including the liquid tank 30 as a main constituent are built in the nuclear reactor vessel 50. The primary coolant return pipe 57 and the primary coolant outlet pipe 58 are fitted to the nuclear reactor vessel 50. This embodiment uses supercritical carbon dioxide (or subcritical carbon dioxide) as the secondary coolant. The heated primary coolant is supplied from the primary coolant outlet pipe 58 to the main heat exchanger 90. After the heat exchange, the primary coolant returns to the nuclear reactor vessel 50 through the return pipe 57. The supercritical carbon dioxide (or subcritical carbon dioxide) gas heated by the main heat exchanger is connected to a supercritical carbon dioxide gas turbine 81 combined with a compressor 82 through an isolation valve 80, and this gas drives the turbine 81 for power generation. The supercritical carbon dioxide (or subcritical carbon dioxide) gas discharged from the gas turbine is cooled with a cooler 83 and is then sent to the compressor 82. The low-temperature supercritical carbon dioxide gas is preliminarily heated by a regenerated heat exchanger 84, and is then sent to the main heat exchanger 90 by using a supercritical carbon dioxide (or subcritical carbon dioxide) gas supply pump 86.

In this small nuclear power generation system that uses the supercritical carbon dioxide gas as the secondary coolant, consideration of thermal conductivities of the coolants are basically needed in order to enhance thermal efficiency that affects an amount of heat exchange between the primary coolant and the secondary coolant. Among the usable gases, hydrogen, helium, air, and nitrogen are compared to one another. Here, the hydrogen gas has the largest thermal conductivity of 0.172 (W/m/K). Meanwhile, helium has a thermal conductivity that is slightly smaller than the foregoing, and a thermal conductivity of the carbon dioxide gas is ⅒ as large as that of the hydrogen gas. In order to increase the amount of heat exchange, it is basically desirable to select the second coolant having a larger thermal conductivity. While the supercritical carbon dioxide gas is selected as the second coolant according to PTL1, helium is a prospective secondary coolant on the premise of a transportable and safe small nuclear power generation system and in consideration of flammability of the hydrogen gas.

Embodiment 13

Figure 22:
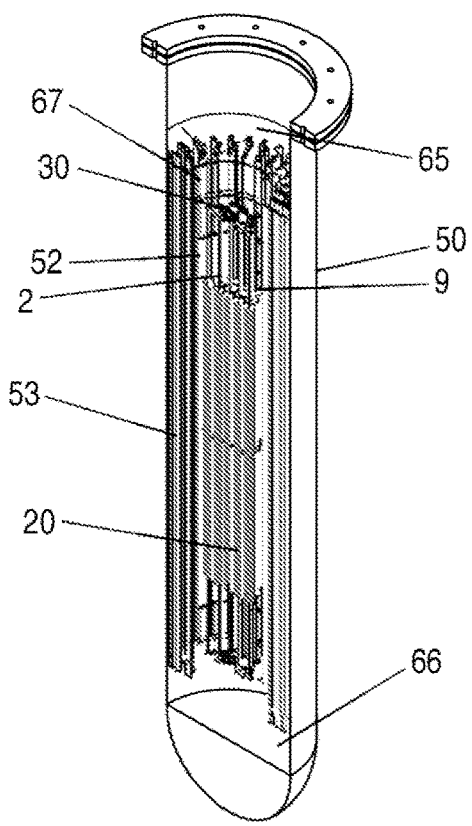
FIG. 22 is a perspective view of a cross section of an embodiment of a thermoelectric power generation mechanism type small nuclear reactor according to the present invention.

FIG. 22 shows an embodiment of a small nuclear reactor system that incorporates a thermoelectric element into the nuclear reactor. The thermoelectric element is an element that converts heat into electric power. The element is formed by bonding two types of different metal or semiconductor materials to each other, and is configured to develop an electromotive force due to the Seebeck effect by applying a difference in temperature between two ends thereof. This element is used for power generation. In order to obtain a large potential difference, a p-type semiconductor material and an n-type semiconductor material are used in combination. Specific examples include the following (NON PATENT LITERATURE 3):

(1) from room temperature to 500K: bismuth-tellurium based (Bi—Te based);

(2) from room temperature to 800K: lead-tellurium based (Pb—Te based); and (3) from room temperature to 1000K:
  (a) silicon-germanium based (Si—Ge based),
  (b) filled skutterudite based: La—Fe—Sb alloy for p type and Ce—Co—Sb alloy for n type, 600° C./50° C., conversion efficiency 6.2%,
  (c) oxide-metal based: combination of material adaptable to 800° C. or below and material adaptable to 300° C. or below, and
  (d) oxide based: oxide of Ca—Co for p-type and oxide of Ca or Mn for n type, 600-400° C./50° C.

Panasonic Corporation produces thermoelectric tubes by employing thermoelectric elements that utilize the Seebeck effect. The contents of this technique have been described in PTL2. Such a tube-type thermoelectric element is built in the nuclear reactor as with a heat exchanger tube.

Specifically, in FIG. 22, the multiple fuel assemblies 20 are loaded in the nuclear reactor 50, and the liquid tank 30 and the cylinders 2 to control the intervals between the fuel assemblies are arranged. The primary coolant natural circulation promotion cylinder 52 is arranged around the fuel assemblies 20, and the neutron-absorbing cylinder 67 is arranged on the outside thereof. An internal secondary coolant outlet manifold 65 is installed at an upper part of the inside of the nuclear reactor 50 while an internal secondary coolant inlet manifold 66 is installed at a lower part thereof. In addition, a tube-type thermoelectric power generation system 53 is installed between these manifolds.

Embodiment 14

In the above-described embodiments, either water or supercritical carbon dioxide gas was used as the secondary coolant. The use of these materials has a drawback of low heat transfer efficiency because these materials have smaller material densities than those of metals. When manufacturing a transportable small nuclear power generation system, it is desirable to form the system as small as possible. The largest factor affecting the downsizing of the system is the heat exchanger. The use of a coolant having low heat transfer efficiency requires an expanded heat transfer area and thus poses a major problem. The heat transfer area can be made smaller by use of a coolant having high heat transfer efficiency. This embodiment employs mercury as the secondary coolant. Mercury is a prospective material as the secondary coolant in the small nuclear power generation system because mercury has the properties of being a liquid at room temperature and having the boiling point of 356.7° C. In the past, this technique had been considered by NASA as a turbine to be mounted on a mobile object (NON PATENT LITERATURE 3), and had actually been filed as a patent for a small turbine (PTL3).

Figure 23:
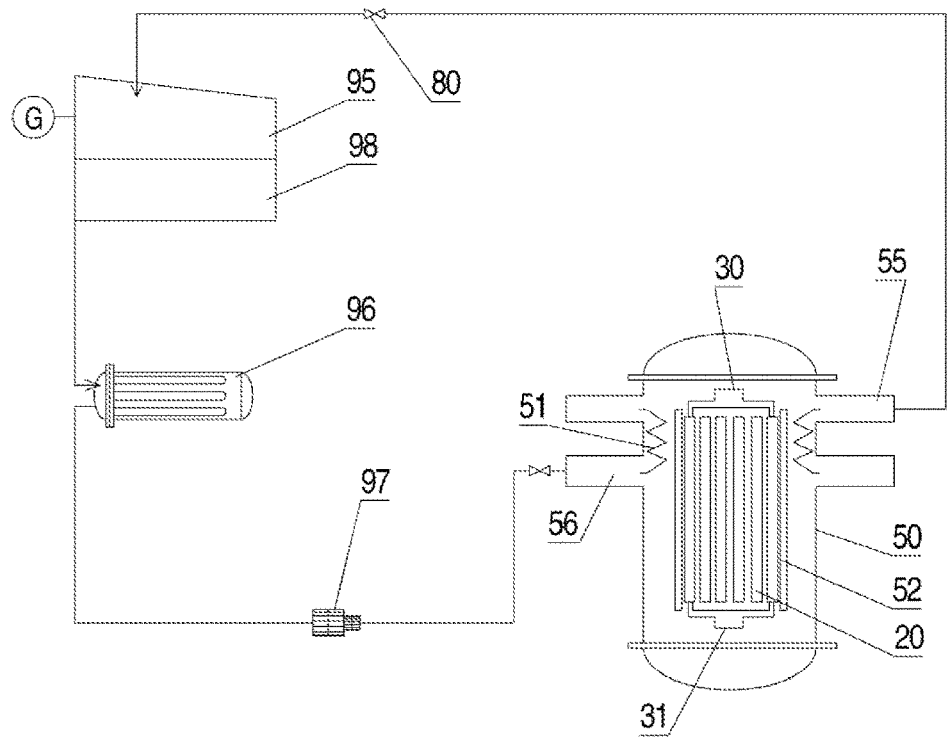
FIG. 23 is a schematic cross-sectional view showing an embodiment of a small nuclear power generation system according to the present invention which uses mercury as a second coolant.

An embodiment of the small nuclear power generation system according to the present invention incorporating the above-mentioned small mercury turbine will be described by referring to FIG. 23. The load-following control mode is enabled by loading the fuel assemblies 20 in the nuclear reactor vessel 50, and fitting the liquid tank 30 and the lower liquid tank 31 on the fuel assemblies. As the primary coolant, Pb—Bi is put in the nuclear reactor vessel 50. In order to naturally circulate the primary coolant, the natural circulation promotion cylinder 52 is installed around the fuel assemblies 20. The heat exchanger 51 is installed in the vessel, and an inlet pipe of the heat exchanger is connected to the secondary coolant inlet manifold 56 while an outlet pipe thereof is connected to the secondary coolant outlet manifold 55. The mercury being the secondary coolant heated by the reactor core is supplied to a turbine 95. The turbine is connected to a mercury condenser 98. The condensed mercury is preliminarily heated by a first mercury heater 96 and is then supplied to the nuclear reactor vessel 50 by using a pump 97.

Although the embodiments have been described above, the present invention is not limited only to the embodiments. It is obvious to those skilled in the art that various changes and modifications are possible within the gist of the present invention and the scope of the appended claims.

REFERENCE SIGNS LIST 1 piston
2 cylinder
4 reflector fitting jig
5 reflector fixing jig
9 fuel assembly support
10 split reflector
11 reflector movement mechanism fixation cylinder
13 outer split reflector
14 inner split reflector
15 bellows
20 fuel assembly
21 fuel rod
24 fuel assembly support plate
25 neutron-absorbing rod
30 liquid tank
31 lower liquid tank
35 fuel assembly interlocking member
50 nuclear reactor vessel
51 heat exchanger
52 natural circulation promotion cylinder
53 tube-type thermoelectric power generation system
55 secondary coolant outlet manifold
56 secondary coolant inlet manifold
57 primary coolant return pipe
58 primary coolant outlet pipe
65 internal secondary coolant outlet manifold
66 internal secondary coolant inlet manifold
67 neutron-absorbing cylinder
70 condenser
71 steam turbine
72 first heater
73 second heater
75 water supply pump
76 primary coolant circulation pump
80 isolation valve
81 supercritical carbon dioxide gas turbine
82 compressor
83 cooler
84 regenerated heat exchanger
85 supercritical carbon dioxide gas circulation pump
86 supercritical carbon dioxide gas supply pump
90 main heat exchanger
91 pressurizer
95 mercury steam turbine
96 first mercury heater
98 mercury condenser

The invention claimed is:
1. A reduced size nuclear power generation system comprising:
a reactor core including a plurality of fuel assemblies, wherein
each fuel assembly is formed from a plurality of fuel rods each prepared by enclosing a metallic fuel into a cladding tube, the metallic fuel containing one or both of
uranium (U)-235 and U-238, and
plutonium (Pu)-239;
a nuclear reactor vessel housing the reactor core;
a primary coolant including any one of metallic sodium (Na), lead (Pb), tin (Sn), and lead-bismuth (Pb—Bi), the primary coolant being put in the nuclear reactor vessel and heated by the reactor core;
a reduced size nuclear reactor including
a neutron reflector arranged around the reactor core in a surrounding fashion, and at least one of a neutron reflector movement mechanism and a fuel assembly interval adjustment mechanism, which are provided in order to control a nuclear reaction in the reactor core, wherein
the neutron reflector has neutron reflection efficiency which establishes a critical state in the core reactor while maintaining an effective multiplication factor of neutrons radiated from the reactor core equal to or above unity,
each of the neutron reflector movement mechanism and the fuel assembly interval adjustment mechanism includes a mechanism containing any of a liquid and a gas, which has a larger thermal expansion rate than that of the neutron reflector, and being configured to convert an amount of volume thermal expansion of any of the liquid and the gas into an amount of linear thermal expansion of any of the liquid and the gas,
the reflector movement mechanism is joined to the neutron reflector and configured to change an interval between the neutron reflector and the reactor core by a displacement attributed to the volume thermal expansion converted into the amount of linear thermal expansion corresponding to a temperature in the nuclear reactor vessel and thereby to change the neutron reflection efficiency,
the fuel assembly interval adjustment mechanism is joined to a member to set an interval between the plurality of fuel assemblies in the reactor core and configured to change the interval between the plurality of fuel assemblies by the displacement attributed to the volume thermal expansion converted into the amount of linear thermal expansion corresponding to the temperature in the nuclear reactor vessel and to change a neutron effective multiplication factor by using the changed interval, and
a load-following control depending on the temperature is enabled by at least one of the neutron reflector movement mechanism and the fuel assembly interval adjustment mechanism;

a secondary coolant;

a heat exchanger configured to perform heat exchange of heat of the primary coolant heated in the reactor core with the secondary coolant; and a turbine power generation system configured to convert heat of the secondary coolant into electric power.

2. The reduced size nuclear power generation system according to claim 1, wherein the metallic fuel is a U—Pu—zirconium (Zr) ternary metallic fuel in which a ratio of a sum of U-235 and Pu-239 is equal to or below 20%.

3. The reduced size nuclear power generation system according to claim 1, wherein a bellows to prevent a leakage of any of the liquid and the gas is fitted between the cylinder-like container and the piston-like member, or any of molybdenum disulfide ($MoS_2$), copper (Cu), and graphite is provided between the cylinder-like container and the piston-like member as a lubricant having a lubrication function and a leakage prevention function to prevent a leakage of any of the liquid and the gas.

4. The reduced size nuclear power generation system according to claim 1, wherein the liquid having the larger expansion rate is a liquid metal selected from the group consisting of lithium (Li), potassium (K), sodium (Na), mercury (Hg), lead (Pb), lead-bismuth (Pb—Bi), gallium (Ga), and zinc (Zn), and the gas having the larger expansion rate is any of helium (He) and argon (Ar).

5. The reduced size nuclear power generation system according to claim 1, wherein the reduced size nuclear power generation system performs load-following control while controlling intervals between a plurality of the neutron reflectors and the fuel assemblies by installing a plurality of the cylinder-like containers and a tank for any of the liquid and the gas on an inside of the neutron reflectors surrounding the reactor core, the neutron reflectors being split into two or more pieces in a circumferential direction, and having a substantially cylindrical shape, wherein the cylinder-like containers are joined to the split neutron reflectors and allow insertion of a plurality of the piston-like members, respectively, the piston-like members being arranged radially from the center of the reactor core, and the tank for any of the liquid and the gas is located at the center of the radially arranged cylinder-like containers, confining any of the liquid and the gas to the tank and the plurality of the cylinder-like containers, and moving each neutron reflector in a radial direction by the amount of linear thermal expansion corresponding to a change in temperature.

6. The reduced size nuclear power generation system according to claim 1, further comprising:

a plurality of the substantially cylindrical neutron reflectors, being split into two or more pieces in a circumferential direction, being further split into two pieces in a radial direction, being further split into two or more pieces in a height direction, and having shapes of a plurality of rings, wherein in each of two groups of the ring-shaped reflectors on an outside and the ring-shaped reflectors on an inside, the ring-shaped reflectors are arranged in a staggered manner in the height direction so as not to overlap one another when viewed in a lateral direction, and the neutron reflectors as a whole surround the reactor core; and a reflector movement mechanism including cylinder-like containers respectively provided with piston-like members being movable in a vertical direction, and a tank establishing fluid communication with the cylinder-like containers, wherein the reduced size nuclear power generation system performs load-following control by fixing the piston-like members to the group of the ring-shaped reflectors on the outside, fixing the group of the ring-shaped reflectors on the inside to the tank, confining any of a liquid or a gas to the cylinder-like containers and to the tank, moving the group of the ring-shaped reflectors on the outside in the vertical direction by an amount of the linear thermal expansion of any of the liquid and the gas corresponding to a change in temperature by using the piston-like members, forming a slit between the group of the ring-shaped reflectors on the outside and the group of the ring-shaped reflectors on the inside, and controlling a leakage amount of neutrons by use of a clearance of the slit.

7. The reduced size nuclear power generation system according to claim 1, wherein the reduced size nuclear power generation system performs the load-following control of the reactor core by arranging the plurality of fuel assemblies substantially concentrically and dividing the fuel assemblies into concentric groups, arranging a tank and a plurality of cylinders into which pistons are inserted, respectively, at least at any of an upper part and a lower part of the fuel assemblies, arranging the plurality of cylinders radially while defining the tank as the center, confining any of a liquid and a gas to the cylinders and the tank, the cylinders and the tank establishing fluid communication with one another, connecting the pistons to the concentric groups, respectively, and moving each concentric group of the fuel assemblies in a radial direction by the amount of linear thermal expansion of any of the liquid and the gas corresponding to a change in temperature.

8. The reduced size nuclear power generation system according to claim 1, wherein the neutron reflector arranged around the reactor core in a surrounding fashion is formed at a height smaller than a height dimension of the reactor core, and is rendered movable from a lower side to an upper side of the reactor core or from the upper side to the lower side of the reactor core by using the movement mechanism.

9. The reduced size nuclear power generation system according to claim 1, wherein a cylinder made of a metal and having a primary coolant natural circulation promotion function and a neutron leakage prevention function is arranged in the nuclear reactor vessel and around the fuel assemblies to which any of the reflector movement mechanism and the fuel assembly interval adjustment mechanism is fitted, and a heat exchanger configured to perform heat exchange between the primary coolant and the secondary coolant is further arranged around the cylinder.

10. The reduced size nuclear power generation system according to claim 1, wherein a neutron absorber is installed at a central part of the fuel assemblies.

11. The reduced size nuclear power generation system according to claim 1, wherein
the reactor core includes the plurality of fuel rods each prepared by enclosing the metallic fuel into the cladding tube,
the metallic fuel including any one of
an alloy made of Zr, U-235, U-238, and Pu-239, and
an alloy made of Zr and any of
U-235 and U-238, and
Pu, and
the cladding tube including any of ferrite stainless steel and chromium (Cr)—Mo steel.

12. The reduced size nuclear power generation system according to claim 1, wherein
the nuclear reactor vessel is formed into a cylindrical shape having a diameter equal to or below 5 m and a height equal to or below 20 m, and
the reactor core to be housed in the nuclear reactor vessel includes the plurality of fuel rods each formed with a diameter in a range from 5 to 15 mm and a length equal to or below 3.0 m.

13. The reduced size nuclear power generation system according to claim 1, comprising:
a main heat exchanger configured
to receive supply of the primary coolant through pipes, the primary coolant being heated by the nuclear reactor, and
to circulate the secondary coolant to be heated by being subjected to heat exchange with the primary coolant, the secondary coolant being made of any of supercritical carbon dioxide, subcritical carbon dioxide, light water, mercury (Hg) and helium (He); and
the turbine power generation system to be driven by the secondary coolant heated by the main heat exchanger, wherein
the main heat exchanger and the turbine power generation system are provided outside the nuclear reactor.

14. The reduced size nuclear power generation system according to claim 1, wherein
the mechanism to convert the amount of volume thermal expansion of any of the liquid and the gas into the amount of linear thermal expansion of any of the liquid and the gas is
a mechanism including a cylinder-like container in which any of the liquid and the gas is injected and a piston-like member inserted into the container so as to confine any of the liquid and the gas to the container, or
a mechanism configured to convert a larger amount of volume thermal expansion into an amount of linear thermal expansion than the case of only the cylinder-like container by joining a tank to the cylinder-like container in which any of the liquid and the gas is injected and the piston-like member is inserted, the tank having a larger capacity than a capacity of the cylinder-like container.

15. The reduced size nuclear power generation system according to claim 14, wherein
the reduced size nuclear power generation system performs load-following control while controlling intervals between a plurality of the neutron reflectors and the fuel assemblies by
arranging a reflector movement mechanism fixation cylinder on an outer periphery of the neutron reflectors surrounding the reactor core, being split into two or more pieces in a circumferential direction, and having a substantially cylindrical shape,
joining the cylinder-like containers or a combination of the cylinder-like containers and the tank to the reflector movement mechanism fixation cylinder, the cylinder-like containers measuring equal to or more than the number of splits of the neutron reflectors, and confining any of the liquid and the gas,
joining the cylinder-like containers or a combination of the cylinder-like containers and a plurality of the piston-like members to the neutron reflectors, each piston-like member penetrating the tank, and
moving each neutron reflector relative to the reflector movement mechanism fixation cylinder by the amount of linear thermal expansion corresponding to a change in temperature.

16. The reduced size nuclear power generation system according to claim 1, wherein a neutron absorber is installed on an outside of the neutron reflector.

17. The reduced size nuclear power generation system according to claim 16, wherein a material suitable for disposal of nuclear waste and the like such as an actinoid-based radioactive element is used as the neutron absorber.

18. The reduced size nuclear power generation system according to claim 1, wherein
the primary coolant is put in the nuclear reactor, and
the turbine power generation system is provided outside the nuclear reactor, the turbine power generation system being configured to be driven by the secondary coolant heated by the heat exchanger in the nuclear reactor vessel, the heat exchanger being heated by the fuel in the nuclear reactor vessel and by the primary coolant heated by the fuel in the nuclear reactor vessel.

19. The reduced size nuclear power generation system according to claim 18, wherein
a group of secondary coolant inlet pipes of a plurality of the heat exchangers installed in the nuclear reactor are connected to a first manifold, and
a group of secondary coolant outlet pipes of the plurality of the heat exchangers are connected to a second manifold.

20. The reduced size nuclear power generation system according to claim 18, wherein
a plurality of tubes, each of which includes a thermoelectric element having a thermoelectric power generation function and being fitted to an inner surface of the tube, are installed around the reactor core, in which any of the fuel assemblies and the fuel assemblies being equipped with the fuel assembly interval adjustment mechanism are loaded in the center of the neutron reflector joined to the movement mechanism,
the primary coolant is put in the nuclear reactor, and
the secondary coolant is supplied to the plurality of tubes.

* * * * *